United States Patent
Wang et al.

(10) Patent No.: US 12,443,866 B2
(45) Date of Patent: Oct. 14, 2025

(54) SEQUENTIAL PATTERN MINING WITH THE MICRON AUTOMATA PROCESSOR

(71) Applicant: University of Virginia Patent Foundation, Charlottesville, VA (US)

(72) Inventors: Ke Wang, Charlottesville, VA (US); Elaheh Sadredini, Charlottesville, VA (US); Kevin Skadron, Charlottesville, VA (US)

(73) Assignee: University of Virginia Patent Foundation, Charlottesville, VA (US)

(\*) Notice: Subject to any disclaimer, the term of this patent is extended or adjusted under 35 U.S.C. 154(b) by 720 days.

(21) Appl. No.: 15/198,521

(22) Filed: Jun. 30, 2016

(65) Prior Publication Data

US 2017/0293670 A1    Oct. 12, 2017

Related U.S. Application Data

(60) Provisional application No. 62/319,393, filed on Apr. 7, 2016.

(51) Int. Cl.
*G06N 7/01* (2023.01)
*G06N 5/047* (2023.01)
*G06V 10/94* (2022.01)

(52) U.S. Cl.
CPC .............. *G06N 7/01* (2023.01); *G06N 5/047* (2013.01); *G06V 10/955* (2022.01)

(58) Field of Classification Search
CPC ................. G06F 17/27; G06F 17/2775; G06F 16/90344; G06F 8/427; G06F 2216/03;
(Continued)

(56) References Cited

U.S. PATENT DOCUMENTS

| | | | |
|---|---|---|---|
| 6,785,677 B1* | 8/2004 | Fritchman | G06F 17/30 707/6 |
| 2008/0140661 A1* | 6/2008 | Pandya | G06F 7/00 707/6 |

(Continued)

OTHER PUBLICATIONS

Dlugosch et al., "An Efficient and Scalable Semiconductor Architecture for Parallel Automata Processing," Dec. 2014, IEEE Transactions on Parallel and Distributed Systems, vol. 25, No. 12, pp. 3088-3098 (Year: 2014).*

(Continued)

*Primary Examiner* — James D. Rutten
(74) *Attorney, Agent, or Firm* — WHDA, LLP

(57) ABSTRACT

A hardware accelerated solution of the SPM (Sequential Pattern Mining) is proposed using Micron's Automata Processor (AP), a hardware implementation of non-deterministic finite automata (NFAs) The Generalized Sequential Pattern (GSP) algorithm for SPM searching exposes massive parallelism, and is therefore well-suited for AP acceleration. The multi puss pruning strategy of the GSP is implemented is the APs fast reconfigurability. A generalized automaton structure is proposed by flattening sequential patterns to simple strings to reduce compilation time and to minimize overhead of reconfiguration. Up to 90× and 29× speedups are achieved by the AP-accelerated GSP on six real-world datasets, when compared with the optimized multicore CPU (Central Processing Unit) and GPU (Graphics Processing Unit) GSP implementations, respectively. The proposed CPU-AP solution also outperforms the state-of-the-art PrefixSpan and SPADE (Sequential PAttern Discovery using Equivalence classes algorithms on multicore CPU by up to 452× and 49× speedups.

31 Claims, 13 Drawing Sheets

(58) Field of Classification Search
CPC .... G06F 6/2465; G06F 11/3664; G06F 17/30; G06F 17/30592; G06K 9/6219; G06N 5/047; G06N 5/04; G06N 7/005; G06V 10/75; G06V 10/955

See application file for complete search history.

(56) References Cited

U.S. PATENT DOCUMENTS

| | | | |
|---|---|---|---|
| 2009/0083294 A1* | 3/2009 | Gao | G06F 40/131 |
| 2009/0172001 A1* | 7/2009 | McMillen | G06F 17/00 707/101 |
| 2016/0357704 A1* | 12/2016 | Fu | G06F 15/80 |

OTHER PUBLICATIONS

Mabroukeh et al., "A Taxonomy os Sequential Pattern Mining Algorithms," Nov. 2010, ACM Computing Surveys, vol. 43, No. 1, Article 3 pp. 3-1 to 3-41 (Year: 2010).*

Sabotta, Christopher, "Advantages and challenges of programming the Micron Automata Processor," 2013, Graduate Theses and Dissertations, 13613, Iowa State University Digital Repository (Year: 2013).*

Roy, Indranil, "Algorithmic Techniques for the Micron Automata Processor," Doctoral Thesis, Georgia Institute of Technology, Aug. 2015 (Year: 2015).*

Indranil Roy and Srinivas Aluru, "Finding Motifs in Biological Sequences using the Micron Automata Processor," IEEE 28th International Parallel & Distributed Processing Symposium, May 19-23, 2014, Phoenix, Arizona USA (Year: 2014).*

Borkar et al., Automatic Segmentation of text into structured records, ACM SIGMOD 2001, May 21-24, 2001, ACM 2001, pp. 175-186 (Year: 2001).*

* cited by examiner

SEQUENTIAL PATTERN MINING WITH THE MICRON AUTOMATA PROCESSOR

RELATED APPLICATION

This application claims priority to U.S. Provisional Application No. 62/319,393, "Sequential Pattern Mining with the Micron Automata Processor," filed Apr. 7, 2016, which application is incorporated by reference herein in its entirety.

STATEMENT OF FEDERALLY SPONSORED RESEARCH/DEVELOPMENT

This invention was made with government funds under Agreement No. HR0011-13-3-0002 awarded by DARPA. The U.S. Government has rights in this invention.

BACKGROUND

Sequential Pattern Mining (SPM) is a data-mining technique that identifies strong and interesting sequential relations among variables in structured databases. SPM has become an important data mining technique with broad application domains, such as customer purchase: patterning analysis, correlation analysis of storage system, web log analysis, software bug tracking, and software API usage tracking [Document 2]. For example, when a person buys a pen, appropriate recommendations for paper and ink may increase sales of a store. SPM is the right technique to mine sequential relations from the records of transactions.

A sequential pattern refers to a hierarchical pattern consisting of a sequence of frequent transactions (itemsets) with a particular ordering among these itemsets. In addition to recognizing frequent set mining (FSM), SPM needs to deal with permutations among the frequent itemsets. This dramatically increases the number of patterns to consider and hence the computational cost relative to simple set mining or string mining operations. In addition, as sizes of interesting datasets keep growing, higher performance becomes critical to make SPM practical.

Many algorithms have been developed to improve the performance of the sequential pattern mining. The three most competitive algorithms today are Generalized Sequential Pattern (GSP) [Document 15], Sequential PAttern Discovery using Equivalence classes (SPADE) [Document 19] and PrefixSpan [Document 12]. SPADE and PrefixSpan are generally favored today and perform better than GSP on conventional single-core CPUs (Central Processing Units) in average cases. However, GSP exposes massive parallelism and is a better candidate for highly parallel architectures.

Several parallel algorithms have been proposed to accelerate SPM on distributed-memory systems, e.g., [Documents 4, 8, 14, and 18]. Increasing throughput per node via hardware acceleration is desirable fir throughput as well as energy efficiency. However, even though hardware accelerators have been widely used in frequent set mining and string matching applications, e.g. [Documents 6, 20, and 21], a hardware-accelerated solution for SPM has not been studied yet.

Micron's new Automata Processor (AP) [Document 5] offers an appealing accelerator architecture for SPM. The AP architecture exploits the very high and natural level of parallelism found in DRAM (Dynamic Random-Access Memory) to achieve native-hardware implementation of non-deterministic finite automata (NFAs). The use of DRAM to implement the NFA states provides a high capacity: the first-generation boards, with 32 chips, provide approximately 1.5M automaton states. All of these states can process an input symbol and activate successor states in a single clock cycle, providing an extraordinary parallelism for pattern matching. The AP's hierarchical and configurable routing mechanism allows rich fan-in and fan-out among states. These capabilities allow the AP to perform complex symbolic pattern matching and test input streams against a large number of candidate patterns in parallel. The AP has already been successfully applied to several applications, including regular expression matching [Document 5], DNA motif searching [Document 13], and frequent set mining [Document 16].

In the present invention, a CPU-AP heterogeneous computing solution is proposed to accelerate SPM based on the GSP algorithm framework, whose multipass algorithm to build up successively larger candidate itemsets and sequences is best suited to the AP's highly parallel pattern-matching architecture, which can check a large number of candidate patterns in parallel. The sequential patterns are identified and counted by an NFA-counter automaton structure on the AP chip. The key idea of designing such an NFA for SPM is to flatten sequential patterns to simple strings by adding, an itemset delimiter and a sequence delimiter. This strategy greatly reduces the automaton design space so that the template automaton for SPM can be compiled before runtime and replicated to make a full use of the capacity and massive parallelism of the AP. This is the first automaton design to identify hierarchical sequential patterns. Instead of the examples of (discontinuous/continuous) sequences of sets shown in the specification, the proposed method can be applied to mine other patterns with hierarchical structures. The proposed program framework can be applied to speed up pattern mining using other AP-like hardware implementations of finite state machine with reconfigurability.

On multiple real-world and synthetic datasets, the performance of the proposed AP-accelerated GSP versus CPU and GPU implementations of GSP (Graphics Processing Units), as well as Java multi-threaded implementations of SPADE and PrefixSpan [Document 7] are compared. The performance analysis of the AP-accelerated GSP shows up to 90× speedup over a multicore CPU GSP and up to 29× speedup over the GPU GSP version. The proposed approach also outperforms the Java multi-threaded implementations of SPADE and PrefixSpan by up to 452× and 49× speedups. The proposed AP solution also shows a good performance scaling as the size of the input dataset grows, achieving even better speedup over SPADE and PrefixSpan. The size scaling experiments also show that SPADE fails at some datasets larger than 10 MB (a small dataset size, thus limiting utility of SPADE in today's "big data" era).

In summary, the present invention achieves the following three goals:
1. A CPU-AP computing infrastructure for GSP algorithm framework is proposed to accelerate SPM by mapping sequential patterns to NFAs.
2. A novel automaton structure for the sequential pattern matching and counting in GSP is designed. This structure flattens the hierarchical patterns to strings and adopts a multiple-entry scheme to reduce the automaton design space for candidate sequential patterns.
3. The CPU-AP SPM solution shows performance improvement and broader capability over multicore and GPU implementations of GSP SPM and also outperforms SPADE and PrefixScan (especially for larger datasets).

Related Works

Because of the larger permutation space and complex hierarchical patterns involved, performance is a critical issue for applying the SPM technique. Many efforts have been made to speed up SPM via software and hardware.

Sequential Algorithms

Generalized Sequential Pattern GSP [Document 15] follows the multi-pass candidate generation—pruning scheme of Apriori algorithm and inherits the horizontal data format and breadth-first-search scheme from it. Also in the family of the Apriori algorithm, Sequential PAttern Discovery using Equivalence classes (SPADE) [Document 19] was derived from the concept of equivalence class [Document 17] for a sequential pattern mining and adopts the vertical data representation. To avoid the multiple passes of candidate generation and pruning steps, PrefixSpan [Document 12] algorithm extended the idea of the pattern growth paradigm [Document 9] to sequential pattern mining.

Parallel Implementations

Shintani and Kitsuregawa [Document 14] proposed three parallel GSP algorithms on distributed memory systems. These algorithms show good scaling properties on an IBM SP2 cluster. Zaki et al. [Document 18] designed pSPADE, a data-parallel version of SPADE for a fast discovery of frequent sequences in large databases on distributed-shared memory systems and achieved up to 7.2× speedup on a 12-processor SGI Origin 2000 cluster. Guralnik and Karypis [Document 8] developed tree-projection-based parallel sequence mining algorithms for distributed-memory architectures and achieved up to 30× speedups on a 32-processor IBM SP cluster. Cong et al. [Document 4] presented a parallel sequential pattern mining algorithm (Par-ASP) under their sampling-based framework for parallel data mining, implemented by using MPI over a 64-node Linux cluster, achieving up to 37.8× speedup.

Accelerators

Hardware accelerators allow a single node to achieve orders of magnitude improvements in performance and energy efficiency. General-purpose GPUs leverage high parallelism, but GPUs' single instruction multiple data (SIMD) and lockstep organization mean that the parallel tasks must generally be similar. In Document 10, the authors present a parallel GSP implementation on GPU, but they relax the problem of sequential pattern mining to itemset mining. No previous work on hardware acceleration for true SPM is known. In particular, SPADE and PrefixSpan have not been implemented on GPU. In the present invention, true GSP for SPM on GPU is implemented.

Micron's AP shows great potential in boosting performance of massive pattern matching applications. The proposed AP-accelerated solution for sequential pattern mining using GSP is shown to have a great performance advantage over other parallel and hardware-accelerated implementations.

DOCUMENT LISTS

1. Micron Automata Processor website, 2015. http://www.micronautomata.com/documentation.
2. C. C. Aggarwal and J. Han, editors. *Frequent Pattern Mining*. Springer International Publishing, Cham, 2014.
3. R. Agrawal and R. Srikant. Mining sequential patterns. In Proc. ICDE '95, pages 3-14. IEEE, 1995,
4. S. Cong, J. Han, J. Hoeflinger, and D. Padua. A sampling-based framework for parallel data mining. In *Proc. PPoPP* '05, ACM, 2005.
5. P. Dlugosch et al. An efficient and scalable semiconductor architecture for parallel automata processing. *IEEE TPDS*, 25(12):3088-3098, 2014.
6. W. Fang et al. Frequent itemset mining on graphics processors. In *Proc. DaMoN* '09, 2009,
7. P. Fournier-Vigor et al. Spmf: A Java open-source pattern mining library. *Journal of Machine Learning Research*, 15:3569-3573, 2014.
8. V. Guralnik and G. Karypis. Parallel tree-projection-based sequence mining algorithms. *Parallel Comput.*, 30(4): 443-472, April 2004.
9. J. Han, J. Pei, and Y. Yin. Mining frequent patterns without candidate generation. In *Proc. SIGMOD* '00. ACM, 2000.
10. K. Hryniów, Parallel pattern mining-application of gsp algorithm for graphics processing units. In ICCC '12, pages 233-236, IEEE, 2012.
11. H. Noyes. Micron automata processor architecture: Reconfigurable and massively parallel automata processing. In *Proc. of Fifth International Symposium on Highly-Efficient Accelerators and Reconfigurable Technologies*, 2014. Keynote presentation.
12. J. Pei et al. Mining sequential patterns by pattern-growth: The prefixspan approach. *IEEE Trans. on Knowl. and Data Eng.*, 16(11):1424-1440, 2004.
13. I. Roy and S. Aluru. Discovering motifs in biological sequences using the micron automata processor. *IEEE/ACM T COMPUT RI*, 13(1):99-111, 2016.
14. T. Shintani and M. Kitsuregawa. Mining algorithms for sequential patterns in parallel: Hash based approach. In *Proceedings of the Second Pacific-Asia Conference on Knowledge Discovery and Data mining*, pages 283-294, 1998.
15. R. Srikant and R. Agrawal. Mining sequential patterns: Generalizations and performance improvements. In *Proc. EDBT* '96, 1996.
16. K. Wang, Y. Qi, J. Fox, M. Stan, and K. Skadron. Association rule mining with the micron automata processor. In *Proc. IPDPS* '15, 2015.
17. M. J. Zaki. Scalable algorithms for association mining. *IEEE Trans. on Knowl, and Data Eng.*, 12(3):372-390, 7000.
18. M. J. Zaki. Parallel sequence mining on shared-memory machines. *J. Parallel Distrib. Comput.*, 61(3):401-426, 2001.
19. M. J. Zaki. Spade: An efficient algorithm for mining frequent sequences. *Mach. Learn.*, 42(1-2):31-60, 2001.
20. F. Zhang, Y. Zhang, and J. D. Bakos. Accelerating frequent itemset mining an graphics processing units. *J. Supercomput.*, 66(1):94-117, 2013.
21. Y. Zu et al, GPU-based NFA implementation for memory efficient high speed regular expression matching, In *Proc. PPoPP* '12, pages 129-1.40, ACM 2012.

SUMMARY

An aspect of an embodiment of the present invention provides, among other things, a hardware-accelerated solution for SPM, using Micron's new AP, which provides native hardware implementation of iron-deterministic finite automata. The proposed solution adopts the algorithm framework of the GSP, based on the downward closure property of frequent sequential patterns. A compact automaton design is derived for matching and counting frequent sequences. A key insight that enables the use of automata for SPM is that hierarchical patterns of sequences are flattened into strings by using delimiters and place-holders. A multiple-entry NFA strategy is proposed to accommodate variable-structured sequences. Together, this allows a single, compact template to match any candidate sequence of a given length, so this template can be replicated to make a full use of the capacity and massive parallelism of the AP.

Another aspect of an embodiment of the present invention provides, among other things, a GSP across different hardware platforms. Up to 430×, 90×, and 29× speedups are achieved by the AP-accelerated GSP on six real-world datasets, when compared with the single-threaded CPU, multicore CPU, and GPU GSP implementations. The AP-accelerated solution also outperforms PrefixSpan and SPADE on multicore CPU by up to 300× and 30×. By parallelizing candidate generation, these speedups are further improved to 432× and 49×. Even more performance improvements can be achieved by hardware support to minimize symbol replacement latency. The AP advantage increases with larger datasets, showing good scaling properties for larger datasets while the alternatives scale poorly.

BRIEF DESCRIPTION OF THE DRAWINGS

For a better understanding of the aforementioned embodiments of the invention as well as additional embodiments thereof, reference should be made to the Description of Illustrative Embodiments below, in conjunction with the following drawings in which like reference numerals refer to corresponding parts throughout the figures.

DESCRIPTION OF ILLUSTRATIVE EMBODIMENTS

Figure 1:
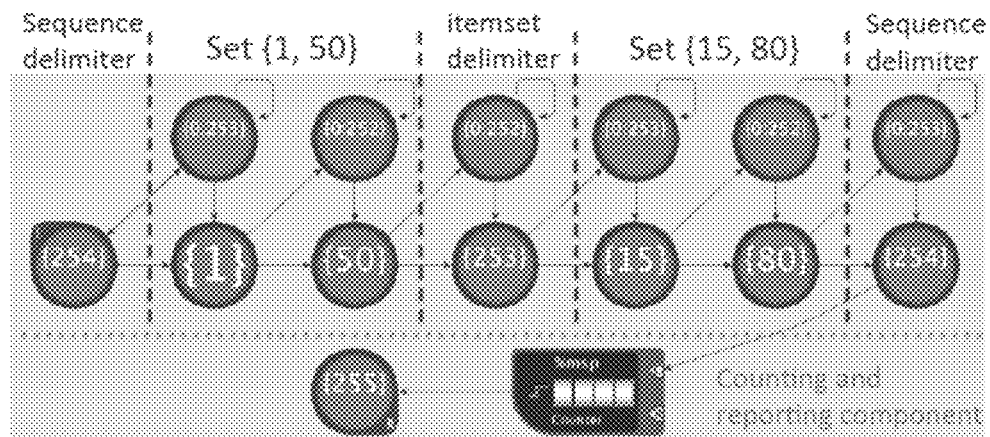
FIGS. 1(a) and (b) illustrate examples of automaton design for sequential pattern matching and counting in accordance with same embodiments. Blue circles and black boxes are STEs (State Transition Elements) and counters, respectively. The numbers on an STE represent the symbol set that STE can match. "0:252" means any item ID in the range of ASCII 0-252. Symbols "255", "254", and "253" are reserved as an input ending, a sequence delimiter, and an itemset delimiter, respectively.
Figure 1:
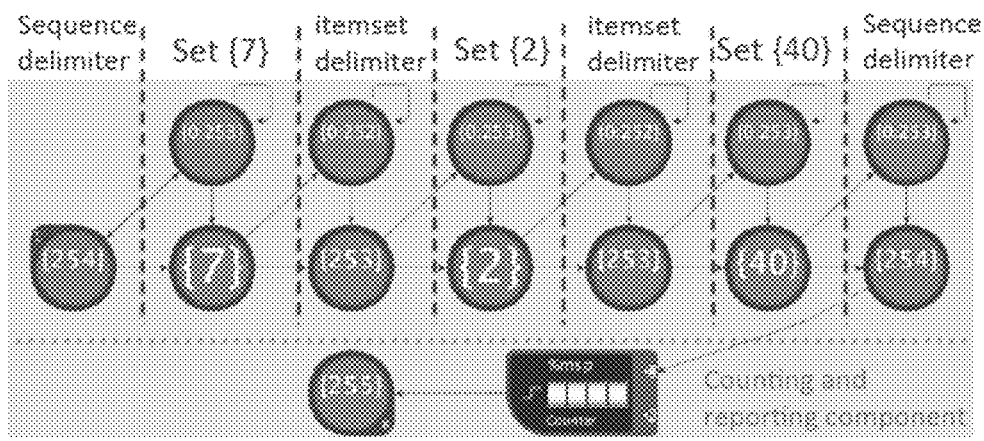

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Sequential Pattern Mining

Introduction to SPM

SPM was first described by Agrawal and Srikant [Document 3]. SPM finds frequent sequences of frequent itemsets. All the items in one itemset have the same transaction time or happen within a certain window of time. However, in SPM, the order among itemsets/transactions matters. In short, SPM looks for frequent permutations of frequent itemsets, which in turn are frequent combinations of items. FSM takes care of the items that are purchased together; for example, "7% of customers buy laptop, flash drive, and software packages together"; whereas in SPM, the sequence in which the items are purchased matters, e.g., "6% of customers buy laptop first, then flash drive, and then software packages."

In a mathematical description, $I=i_1, i_2, \ldots, i_m$ is defined as a set of items, where $i_k$ is usually represented by an integer, call item ID. Let $s=<t_1 t_2 \ldots t_n>$ denotes a sequential pattern (or sequence), where $t_k$ is a transaction and also can be called as an itemset. An element of a sequence is defined by $t_j=\{x_1, x_2, \ldots, x_m\}$ where $x_k \in I$. In a sequence, one item may occur just once in one transaction but may appear in many transactions. It is assumed that the order within a transaction (itemset) does not matter, so the items within one transaction can be lexicographically ordered in preprocessing stage. The size of a sequence is defined as the number of items in it. A sequence with a size k is called a k-sequence. Sequence $s_1=<t_1 t_2 \ldots t_m>$ called to be a subsequence of $s_2=<r_1 r_2 \ldots r_j>$, if there are integers $1 \preccurlyeq k_1 \prec k_2 \prec \ldots \prec k_{m-1} \prec k_m \preccurlyeq j$ such that $t_1 \subseteq r_{k1}, t_2 \subseteq r_{k2}, \ldots, t_m \subseteq r_{km}$. Such a sequence $s_j$ is called a sequential pattern. The support for a sequence is the number of total data sequences that contains this sequence. A sequence is known as frequent iff (if and only if) its support is greater than a given threshold value called minimum support, minsup. The goal of SPM is to find out all the sequential patterns, whose supports are greater than minsup.

Generalized Sequential Pattern Framework

The GSP method is based on the downward-closure property and represents the dataset in a horizontal format. The downward-closure property means that all the subsequences of a frequent sequence are also frequent and thus for an infrequent sequence, all its supersequences must also be infrequent. In GSP, candidates of (k+1)-sequences are generated from known frequent k-sequences by adding one more possible frequent item. The mining begins at 1-sequence, and the size of candidate sequences increases by one with each pass. In each pass, the GSP algorithm has two major operations: 1) Candidate Generation: generating candidates of frequent (k+1)-sequences from known frequent k-sequences 2) Matching and Counting: matching candidate sequences and counting support.

Sequence Candidates Generation

In GSP, the candidates of (k+1)-sequences are generated by joining two k-sequences that have the same contiguous subsequence. c is a contiguous subsequence of sequence $s=<t_1 \ t_2 \ \ldots \ t_n>$ if one of these conditions hold:
1. c is derived from s by deleting one item from either $t_1$ or $t_n$.
2. c is derived from s by deleting an item from an transaction which has at least two items.
3. c is a contiguous subsequence of c′, and c′ is a contiguous subsequence of s. Candidate sequences are generated in two steps as follows.

Joining phase: Two k-sequence candidates ($s_1$ and $s_2$) can be joined if the subsequence formed by dropping the first item in $s_1$ is the same as the subsequence formed by dropping the last items in $s_2$. Consider frequent 3-sequences $s_1=<\{A, B\} \{C\}>$ and $s_2=<\{B\} \{C\} \{E\}>$ in Table 1. Dropping the first items in $s_1$ results in $<\{B\} \{C\}>$, and dropping the last element in $s_2$ results in $<\{B\} \{C\}$. Therefore, $s_1$ and $s_2$ can get joined to a candidate 4-sequence $s_3=<\{A, B\} \{C\} \{E\}>$. Note that here {E} will not merge into the last itemset in the $s_1$, because it is a separate element in $s_2$.

Pruning Phase: If a sequence has any infrequent subsequence, this phase must delete this

TABLE 1

Example of candidate generation

| Frequent 3-sequences | Candidate 4-sequences | |
|---|---|---|
| | Joined | Pruned |
| < {B} {C} {E} > | < {A, B} {C} {E} > | < {A, B} {C, D} > |
| < {A, B} {C} > | < {A, B} {C, D} > | |
| < {B} {C, D} > | | |
| < {A} {C, D} > | | |
| < {A, B} {D} > | | | candidate sequence. For example, in Table 1, candidate $<\{A, B\} \{C\} \{E\}>$ gets pruned because subsequence $<\{B\}\{C\} \{E\}>$ is not a frequent 3-sequence.

Matching and Counting

The matching-and-counting stage will count how many times the input matches a sequence candidate. The occurrence of each candidate pattern is recorded and compared with the minimum support number. The matching and counting stage is the performance bottleneck for GSP, but it exposes massive parallelism. The high density of on-chip state elements and fine-granularity communication found on the AP allows many candidate sequences (patterns) to be matched in parallel, making the AP a promising hardware performance booster for matching and counting operations of GSP. For this reason, the GSP algorithm becomes a natural choice for mapping SPM onto the AP. In the present invention, it is shown how to utilize the AP to speed up the matching-and-counting stage of GSP and how this solution compares with other parallel or accelerator implementations of SPM. For a comparison purpose, OpenMP and CUDA implementations are proposed for multicore CPU and GPU to speed up the matching and counting of GSP.

Automata Processor

Architecture

The AP chip has three types of functional elements: the state transition element (STE), counters, and Boolean elements [Document 5]. The STE is the central feature of the AP chip and is the element with the highest population density. An STE holds a subset of 8-bit symbols via a DRAM column and represents an NFA state, activated or deactivated, via an one-bit register. The AP uses a homogeneous NFA representation [Document 5] for a more natural match to the hardware operation. In terms of Flynn's taxonomy, the AP is therefore a very unusual multiple-instruction, single-data (MISD) architecture: each state (column) holds unique responses (instructions) to potential inputs, and they all respond in parallel to each input. Most other commercial architectures are von. Neumann architectures, e.g. single CPU cores (SISD), multicore or multiprocessors (MAID), and GPUs (SIMD).

The counter element counts the occurrence of a pattern described by the NFA connected to it and activates other elements or reports when a given threshold is reached. One counter can count up to $2^{12}-1$. Two or more counters can be daisy-chained to handle a larger threshold. Counter elements are a scarce resource of the AP chip, and therefore, become an important limiting factor for the capacity of the SPM automaton proposed in this work.

Micron's current generation AP-D480 boards use AP chips built on 50 nm DRAM technology, running at an input symbol (8-bit) rate of 133 MHz. A D480 chip has 192 blocks, with 256 STEs, 4 counters and 12 Boolean elements per block [Document 5]. An AP board with 32 AP chips is assumed, so that all AP chips process input data stream in parallel.

Input and Output

The AP takes input streams of 8-bit symbols. Any STE can be configured to accept the first symbol in the stream (called start-of-data mode, small "1" in the left-upper corner of STE in the following automaton illustrations), to accept every symbol in the input stream (called all-input mode, small "∞" in the left-upper corner of STE in the following illustrations) or to accept a symbol only upon activation.

Any type of element on the AP chip can be configured as a reporting element; one reporting element generates a one-bit signal when it matches the input symbol. If any reporting element reports on a particular cycle, the chip will generate an output vector which contains 1's in positions corresponding to the elements that report and 0's for reporting elements that do not report. Too frequent outputs will cause AP stalls. Therefore, minimizing output vectors is an important consideration for performance optimization.

Programming and Configuration

The Micron's AP SDK provides Automata Network Markup Language (ANML), an XML-like language for describing automata networks, as well as C, Java and Python binding interfaces to describe automata networks, create input streams, parse output, and manage computational tasks on the AP board. A "macro" is a container of automata for encapsulating a given functionality, similar to a function or subroutine in common programming languages.

Deploying automata onto the AP fabric involves two stages: placement-and-routing compilation (PRC) and loading (configuration) [Document 1]. In the PRC stage, the AP compiler deduces the best element layout and generates a binary version of the automata network. In the cases of large number of topologically identical automata, macros or templates can be precompiled in PRC stage and composed later [Document 13]. This shortens PRC time, because only a small automata network within a macro needs to be processed, and then the board can be tiled with as many of these macros as fit.

A pre-compiled automata only needs the loading stage. The loading stage, which needs about 50 milliseconds for a whole AP board [Document 13], includes two steps: routing configuration/reconfiguration that programs the connections, and the symbol set configuration/reconfiguration that writes the matching rules for the STEs. The changing of STE rules only involves the second step of loading, which takes 45 milliseconds for a whole AP board. The feature of fast partial reconfiguration plays a key role in a successful AP implementation of SPM: the fast symbol replacement helps to deal with the case that the total set of candidate patterns exceeds the AP board capacity; the quick routing reconfiguration enables a fast switch from k to k+1 level in a multiple-pass algorithm like GSP for sequence mining.

Mapping SPM onto the AP

As discussed previously, the GSP algorithm maps to the AP architecture naturally, and the sequential pattern matching-and-counting step is the performance bottleneck of the GSP on conventional architectures. Therefore, the CPU-AP solution is proposed for accelerating the matching-and-counting step.

Automaton of Matching and Counting

The hierarchical patterns SPM, sequences of itemsets, are more complex than strings or individual itemsets as studied in the previous works [Documents 13 and 16]. Within itemsets of a sequence, items of interest may be discontinuous, i.e., some frequent subset of an itemset may only be interested [Document 16] while one input sequence may have irrelevant itemsets in between interesting itemsets. The matching part of the automaton for SPM should identify the interesting itemsets as well as the order among the itemsets. In summary, the automaton design needs to deal with all possible continuous and discontinuous situations for both items land itemsets and keep the order among itemsets at the same time. There is no previous work that has proposed an automaton design for a hierarchical pattern matching. Furthermore, in order to maximize benefit from the high parallelism of NFAs, and the Micron's AP in particular, an appropriate automaton structure must be as compact as possible, to maximize the number of such structures that can be accommodated in a single pass.

Flattening the Hierarchy of Sequential Patterns

To match sequences of itemsets, sets are first converted into strings with a pre-defined order. And, a delimiter of itemsets is introduced to bound and connect these strings (converted from itemsets) within a sequential pattern. The sequence of strings is also a string. Based on this observation, the hierarchy of a sequence of itemsets is therefore flattened to a discontinuous sequence-matching problem. This is the key innovation of proposed automaton design for SPM in the present invention.

FIG. 1 shows the automaton design for a Sequential pattern matching and counting. In the examples shown here, the items are coded as digital numbers in the range from 0 to 252, with the numbers 255, 254, 253 reserved as the data-ending reporting symbol, sequence delimiter, and itemset delimiter, respectively. Other choices of these three special symbols also work well within the proposed algorithm framework. In the case of more than 253 frequent items, two conjunctive STEs are used to represent an item and support up to 64,009 frequent items, which is sufficient in all the datasets examined (because the AP native symbol size is 8 bits, this will require two clock cycles to process each 16-bit symbol.). Even larger symbol alphabets are possible by longer conjunctive sequences. In FIG. 1, the counting and reporting component is shown below as an orange dotted line. The I/O optimization strategy proposed in [Document 16] is adopted by delaying all reports from frequent patterns to the last cycle.

The STEs for matching sequential patterns are shown as the orange dotted line. One matching NFA is bounded by a starting sequence delimiter for starting a new sequence and an ending sequence delimiter (the saute symbol) for activating the counting-and-reporting component. In contrast to the set-matching NFAs proposed in [Document 16], the NFA for SPM is divided into several itemsets, demarcated by the itemset delimiters. Each NFA has two rows of STEs. The bottom row is for the actual symbols in a candidate sequential pattern. The STEs in the top row, called "position holders," help to deal with the discontinuous situations (with itemsets or between itemsets). Each "position holder" has a self-activation connection and matches all valid symbols (excluding the delimeters). As long as the input symbol stays in range, the "position holder" will stay activated and keep activating the next STE in the bottom row. The key idea to implement a hierarchical pattern matching with the flattened automaton design is to define two types of "position holder": "itemset position holder" and "item position holder." In the case of sequential pattern, the first "position holder" in each itemset should be an itemset position holder, 0:253. It will stay activated before the end of a sequence and handle discontinuous itemsets within that sequence. The other "position holders" are "item position holders", 0:252, which only hold the position within an input itemset. In the example shown in FIG. 1(a), any other itemsets except a superset of {1, 50}, will not reach the itemset delimiter. After a superset of {1, 50} is seen, the "position holder" above STE "15" will hold the position (activate itself) until the end of the same input sequence. Namely, after a superset of {1, 50} is seen, the itemsets other than the superset of {15, 80} are ignored before a superset of {15, 80} appears in the same input sequence. It is noted that more sophisticated hierarchical patterns, such as a sequence of sequences, a set of sequences or a pattern of more than a two-level hierarchy, can be implemented using the same idea.

The only difference between an "item position holder" and an "itemset position holder" is their symbol set. One important advantage of the flattened automaton design is that one such automaton structure can deal with all situations of the same encoded pattern length (the encoded pattern length includes the itemset delimiters). This feature greatly reduces the design space of sequential pattern matching automata. For example, the automaton structure shown in FIG. 1 can deal with all these cases: <{a, b, c, d, e}>, <{a} {b, c, d}>, <{a, b} {c, d}>, <{a, b, c} {d}>, <{a} {b} {c}>. The actual item IDs are defined in a sequential pattern without counting delimiters as "effective items," and the pattern that considers the itemset delimiters are defined as "encoded pattern." In this step, the automaton design space for a given length of "encoded pattern" is reduced to 1.

Multiple-Entry NFAs

In each GSP level, there could be 0 to k−1 delimiters in actual patterns, and the encoded pattern lengths of level k can vary from k (a sequence consisting of a single itemset) to k+k−1 (all the itemsets only have a single item, there are k−1 itemset delimiters). Because candidate sequences are generated at runtime, the number of patterns to be checked at a given encoded length is not known before runtime. A further step is needed to reduce the automaton design space of the candidates for each GSP iteration to one single template, so that the place and routing can be done before runtime.

Figure 2:
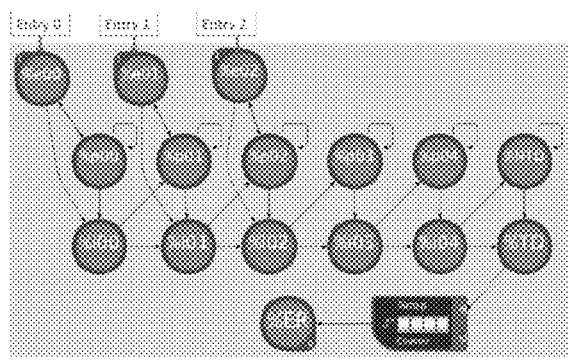
FIGS. 2(a)-(d) illustrate a small example of multiple-entry NFA for all possible sequences of effective size 3 in accordance with some embodiments. (a) is the macro of this ME-NFA-VSI with parameters.
Figure 2:
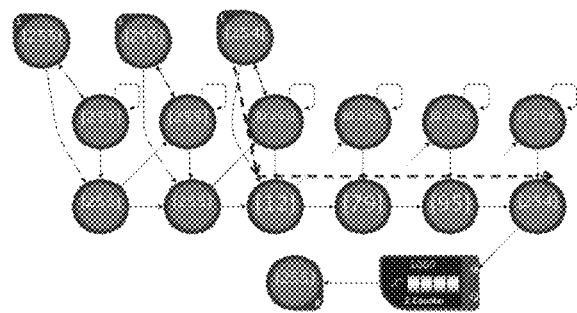
Figure 2:
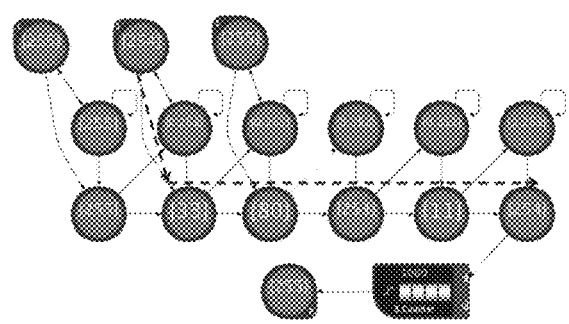
Figure 2:
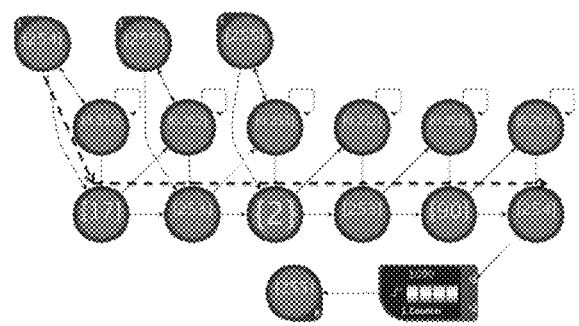

To solve this problem, the idea of multiple-entry NFAs is adopted for variable-site itemsets (ME-NFA-VSI) proposed by Wang et al. [Document 16]. FIG. 2 shows an example of the ME-NFA-VSI structure that can handle all possible cases of sequences of effective length 3. FIG. 2(a) shows the ANML macro of this ME-NFA-VSI structure, leaving some parameters to be assigned for a specific sequence. % TD and % NTD are the sequence delimiter and its complement and are assigned to "254" and "0-251" respectively. % ER is the ending and reporting symbol of the input stream and is assigned to "255" in the present example. % e00-% e02 are symbols for three entries. Only one entry is enabled for a given sequence. % i00-% i04 are individual symbols of items and itemset delimiter. % p00-% p04 are the corresponding "position holders."

To match and count a sequence of three itemsets (two itemset delimiters are introduced), the first entry is enabled by "254," the sequence delimiter, and the other two entries are blocked by "255" (FIG. 2(d)). The sequence matching will start at the left most item symbol and handle the cases of <{X}{Y}{Z}>. Similarly, this structure can be configured to handle other situations by enabling a different entry point (FIGS. 2(c) and (d)).

Macro Selection and Capacity

The flattening strategy and multiple-entry strategy previously introduced shrink the automata design space (the number of different automata design) of a sequential pattern of length k from $2^{k-1}$ patterns to a single pattern template, which makes it possible to pre-compile a library of automata for each level k and load the appropriate one to the AP chip at runtime. In each level k, the different encoding schemes, 8-hit and 16-bit, and the support threshold (greater than 4095 or not) lead to four different automaton designs. To count a support number larger than 4095, two counters should be daisy-chained to behave as a larger counter. In this case, counters are more likely a limiting factor of the capacity.

The actual capacity of a macro may be limited by STEs, counters, or routing resources of the AP chip. A library of macro structures is developed as previously described and is compiled all these macros with the newest Micron AP compiler (v1.6-5). Tables 2 and 3 show the actual capacities of macros for the different encoding schemes, support number, and level range. It is noted that across all of our datasets, a case of k larger than 20 is never encountered.

TABLE 2

Number of macros that fit into one block with 8-bit encoding

|  | k ≤ 10 | 10 < k ≤ 20 | 20 < k ≤ 40 |
|---|---|---|---|
| sup < 4096 | 4 | 2 | 1 |
| sup ≥ 4096 | 2 | 2 | 1 |

TABLE 3

Number of macros that fit into one block with 16-bit encoding

|  | k ≤ 5 | 5 < k ≤ 10 | 10 < k ≤ 20 |
|---|---|---|---|
| sup < 4096 | 4 | 2 | 1 |
| sup ≥ 4096 | 2 | 2 | 1 |

192 AP blocks per D480 AP chip; 6144 blocks per 32-chip AP board.

Program Infrastructure

Figure 3:
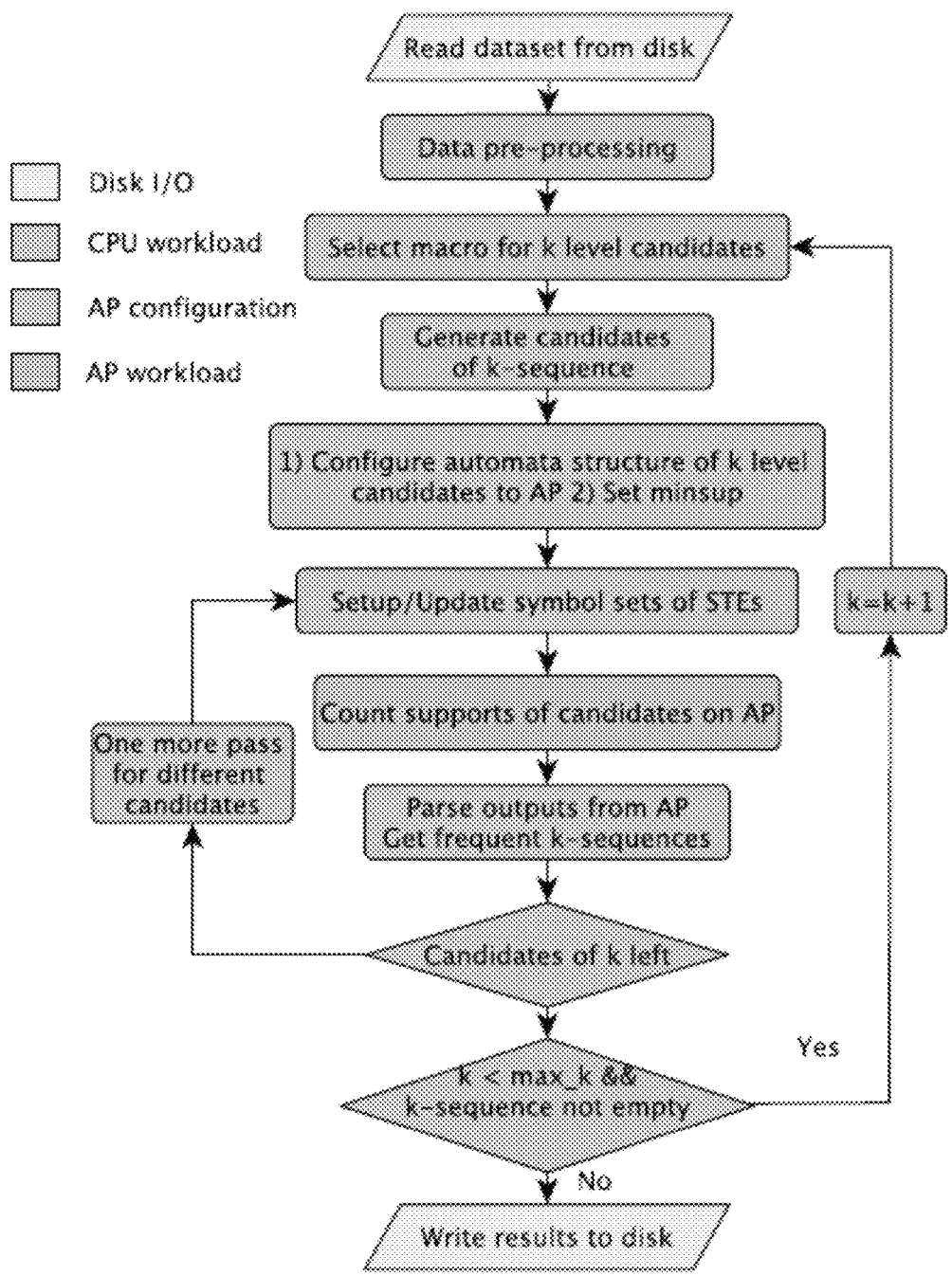
FIG. 3 illustrates a workflow of AP-accelerated SPM in accordance with some embodiments.

FIG. 3 shows the complete workflow of the AP-accelerated SPM proposed in the present invention. The data pre-processing step creates a data stream from the input dataset and makes the data stream compatible with the AP interface. Ike-processing consists of the following steps:
1. Filter out infrequent items from input sequences.
2. Recode items into 8-bit or 16-bit symbols.
3. Recode input sequences.
4. Son items within each itemset of input sequences, and connect itemsets and sequences. Step 1 helps to avoid unnecessary computing on infrequent items and reduces the dictionary size of items. Depending on the number of frequent items, the items can be encoded by 8-bit (freq_item#<25:4) or 16-bit symbols (254<=freq_item #<=64000) in Step 2. Different encoding schemes lead to different automaton designs and different automaton capacities. Step 3 removes infrequent items from the input sequences, recodes items, and removes very short transactions (fewer than two items). Step 4 sorts items in each itemset (in any given order) to fit the automaton design previously described. The data pre-processing is only carried out once per work-flow.

Each iteration of the outer loop shown in FIG. 3 explores all frequent k-sequences from the candidates generated from (k−1)-sequences. In the beginning of a new level, an appropriate precompiled template macro of automaton structure for sequential patterns is selected according to k, encoding scheme (8-bit or 16-bit), and the minimum support, and is configured onto the AP board with many instances filled up the whole board. The candidates are generated on the CPU and are filled into the instances of selected automaton template macro. The input data formulated in pre-processing is then streamed into the AP board for matching and counting.

Experimental Results

The performance of the AP implementation is evaluated using CPU timers, stated configuration latencies, and an AP simulator in the AP SDK [Documents 1 and 11], based on a 32-chip Micron D480 AP board. Because the AP advances by one 8-bit symbol every clock cycle, the number of patterns that can be placed into the board and the number of candidates that must be checked in each stage, determine how many passes through the input are required, which allows a simple calculation to determine the total time on the AP.

Comparison with Other Implementations

The performance of the proposed AP-accelerated GSP (GSP-AP) versus the multi-threaded Java GSP implementation (GSP-JAVA) is compared from spnf toolkit [Document 7] as well as a highly optimized GSP single core CPU C implementation (GSP-1C), a multicore implementation using OpenMP, (GSP-6C), and a GPU implementation (GSP-1G) of the GSP algorithm. The AP-accelerated GSP is compared with Java multi-threaded implementations of SPADE and PrefixSpan [Document 7]. Because GSP-1C is always faster than GSP-JAVA, the results of GSP-JAVA are not shown in the present invention, but they are used it as a baseline to determine the feasible ranges of minimum support number.

Multicore and GPU GSP

In multicore and GPU implementations of GSP, the most time-consuming step, the matching and counting, is parallelized using OpenMP and CUDA.

GSP-GPU: After filtering out the infrequent items, the whole dataset is transferred to the GPU global memory. Then, the algorithm iterates over two steps: (1) generating (k+1)-sequence candidates from the frequent k-sequences on CPU, and (2) identify the frequent (k+1)-sequences on GPU. In the CUDA kernel function, each thread is responsible for matching and counting one candidate in the input dataset. Once the matching and counting phase is done for all the candidates of k+1 level, the results are transferred back to the CPU for the next level. Pruning in the candidate generation step (neither in AP nor in GPU implementation) is not considered as it increases pre-processing time and decreases the overall performance. An array data structure is used to contain candidates and the input database for GPU and AP implementations to optimize the performance of candidate pattern generation.

GSP-multi-core: Work flow is the same as the GSP-CPU implementation except that the matching and counting step is parallelized OpenMP. The CPU version adopts the data structure of linked-list to accelerate the pruning and counting operations to achieve the best overall performance.

Testing Platform and Parameters

All of the above implementations are tested using the following hardware:
CPU: Intel CPU i7-5820K (6 physical cores, 3.30 GHz).
Memory: 32 GB, 1.333 GHz.
GPU: Nvidia Kepler K40C, 706 MHz clock, 288$ CUDA cores, 12 GB global memory.
AP: D480 board, 133 MHz clock, 32 AP chips (simulation).

For each benchmark, the performance of the above implementations is compared over a range of minimum support values. A lower minimum support number requires a larger search space (because more candidates survive to the next generation) and more memory usage. To finish all experiments in a reasonable time, minimum support numbers that produce computation times of the GSP-JAVA are selected in the range of 2 seconds to 2 hours. A relative minimum support number, defined as the ratio of a minimum support number to the transaction number, is adopted in the figures.

TABLE 4

Datasets

| Name | Sequences# | Aver. Len. | Item# | Size (MB) |
|---|---|---|---|---|
| BMS1 | 59601 | 2.42 | 497 | 1.5 |
| BMS2 | 77512 | 4.62 | 3340 | 3.5 |
| Kosarak | 69998 | 16.95 | 41270 | 4.0 |
| Bible | 36369 | 17.84 | 13905 | 5.4 |
| Leviathan | 5834 | 33.8 | 9025 | 1.3 |
| FIFA | 20450 | 34.74 | 2990 | 4.8 |

Aver. Len. = Average number of items per sequence.

Datasets

Six public real-world datasets for sequential pattern mining found an spmf [Document 7] website are tested. The details of these datasets are shown in Table 4.

GSP-AP Vs. Other GSP Implementations

Figure 4:
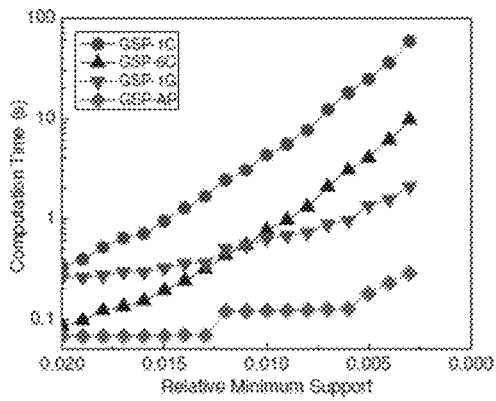
FIGS. 4(a)-(f) illustrate a performance comparison among GSP-1C, GSP-6C, GSP-1G, and GSP-AP on six benchmarks in accordance with some embodiments.
Figure 4:
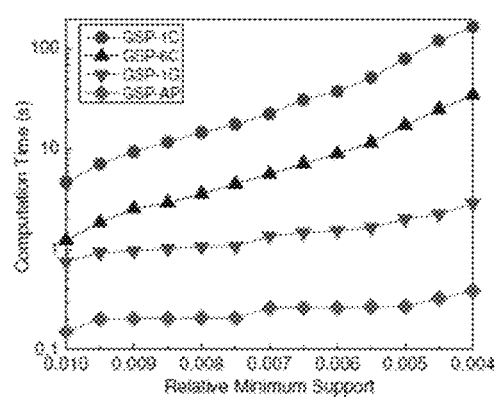
Figure 4:
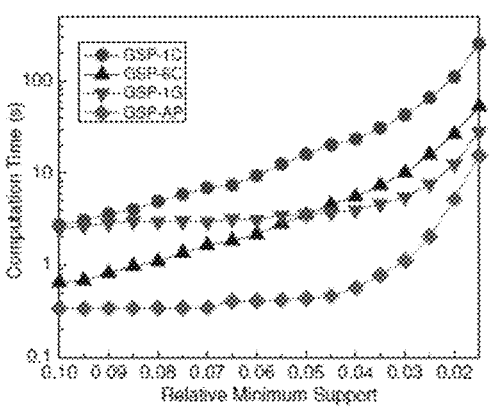
Figure 4:
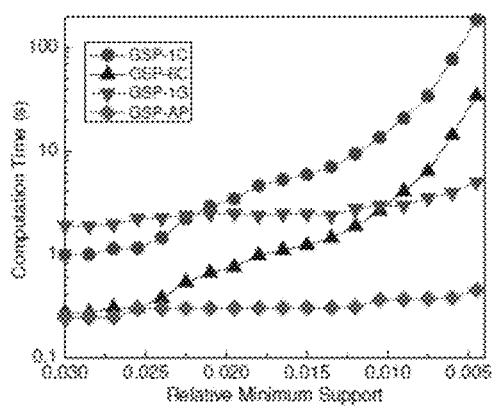
Figure 4:
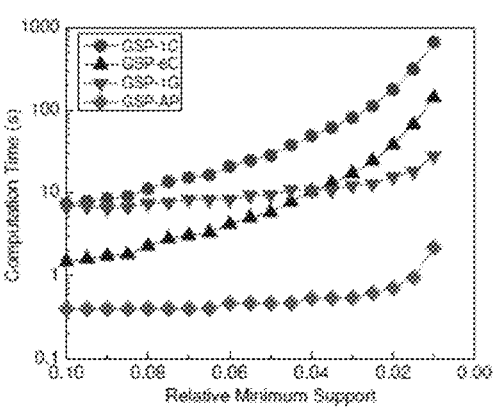
Figure 4:
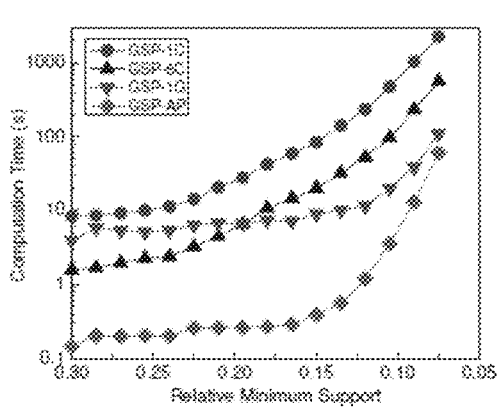

FIG. 4 shows the performance comparison among four different GSP implementations. As the minimum support number de-creases, the computation time of each method increases, as a larger pattern search space is exposed. On average, the performance relationship among the four tested implementations follows this order: GSP-1C<GSP-6C<GSP-1G<GSP-AP. The multicore GSP-6C achieves about 3.7x-6x speedup over single-core version GSP-1C. The GPU version outperforms GSP-1C up to 63x. GSP-1G shows better performance than GSP-6C at large support numbers but loses at small ones. This indicates that more parallelism needs to be exposed for GPU implementation to compensate for the data transfer overhead between CPU and GPU. The proposed GSP-AP is the clear winner, with a max 430x on the BMS2) speedup over single-core, up to 90x speedup over multicore, and 2-29x speedup over GPU.

Timing Breakdown and Speedup Analysis

Figure 5:
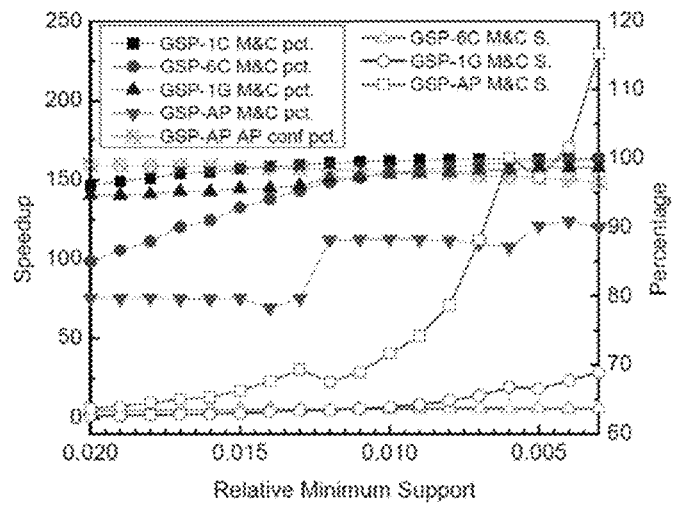
FIGS. 5(a)-(c) illustrate a timing breakdown and speedup analysis on GSP implementations in accordance with same embodiments. The "M&C percentage" means the percentage of matching and counting steps within the total GSP execution time. The "AP conf percentage" means the percentage of AP configuration time, including both routing configuration time and symbol replacement time, in total AP matching and counting time.
Figure 5:
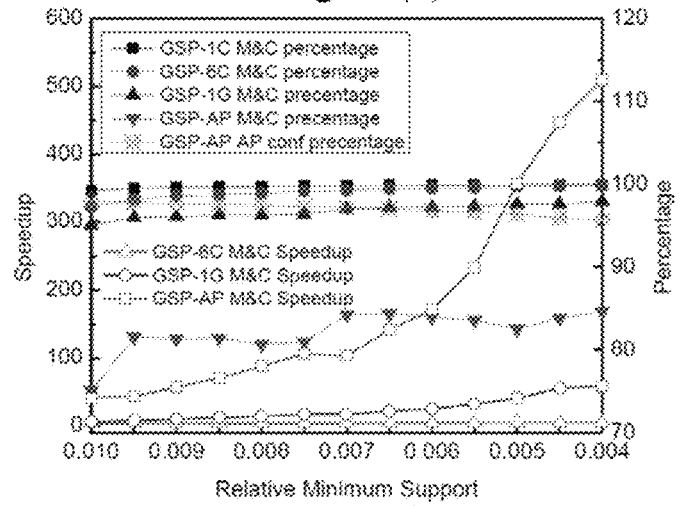
Figure 5:
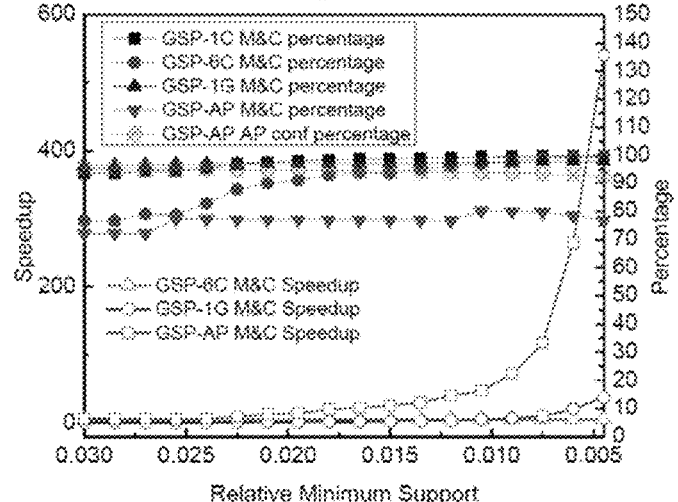
Figure 6:
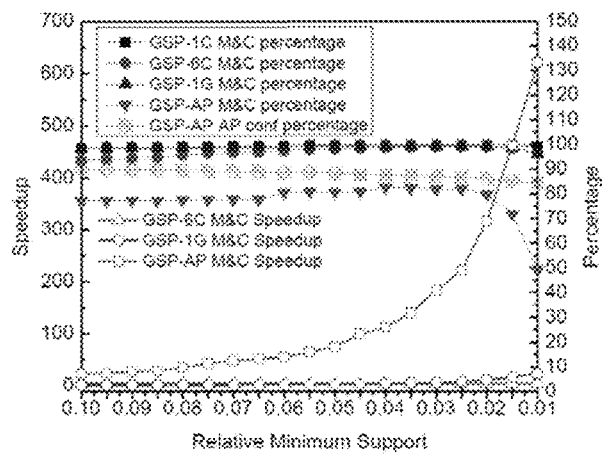
FIGS. 6(a)-(c) illustrate a timing breakdown and speedup analysis on GSP implementations in accordance with some embodiments.
Figure 6:
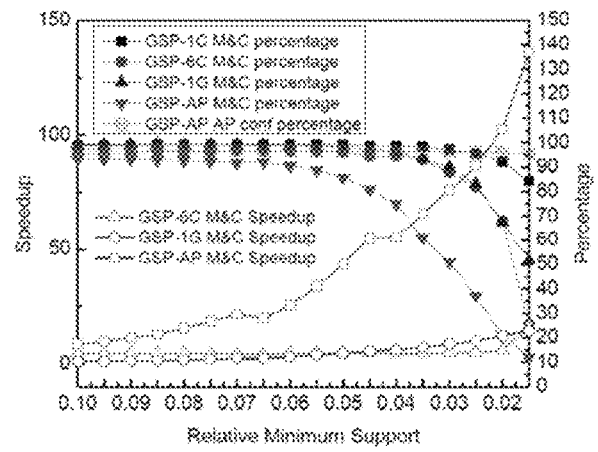
Figure 6:
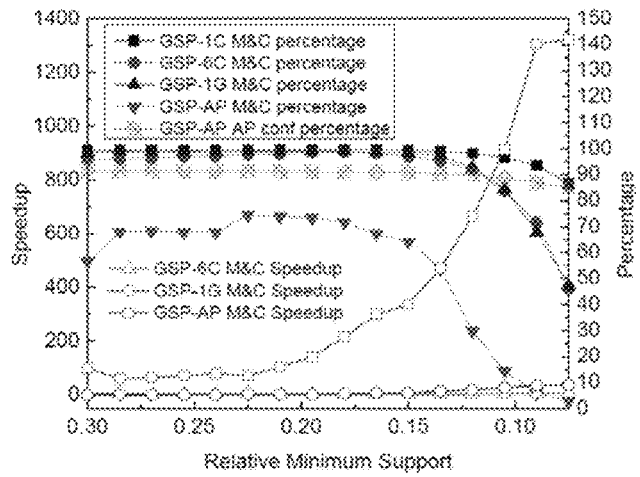

To better understand the performance shown in FIG. 4, profiling results are shown in FIGS. 5 and 6. Focusing on the matching and counting stage, the multi-care and GPU versions achieve 5x and tens-x speedups over single-core CPU implementation, while the AP implementation achieves several hundreds to 1300 times speedups over the sequential matching and counting implementation. The smaller the minimum support, the more candidates are generated, and the larger the speedups achieved for both GPU and AP versions. On one hand, it shows the performance boost of massive complex-pattern matching achieved by the AP. On the other hand, Amdahl's law starts to take effect at small support numbers, with the percentage of time for matching and counting within the total execution time dropping, and the un-accelerated candidate-generation stage becoming dominant. This could be addressed by parallelizing candidate generation, as previously discussed. Amdahl's law has even more severe impact on the AP version than on GPU implementation. FIFA is one typical example, where over 1300x speedup is achieved at 7.5% relative support, but the percentage of matching and counting drops to 3%.

Figure 7:
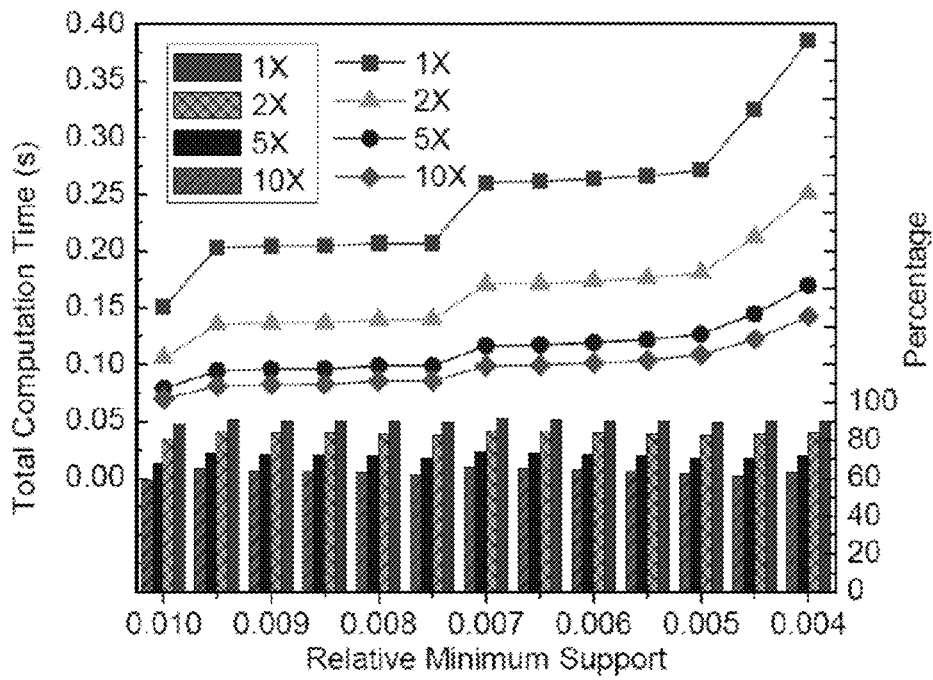
FIGS. 7(a) and (b) illustrate an impact of symbol replacement time on GSP-AP performance for BMS2 and Kosarak in accordance with some embodiments. The columns show the percentage of AP configuration time in total AP matching and counting time. The symbols and lines show overall all computation time.
Figure 7:
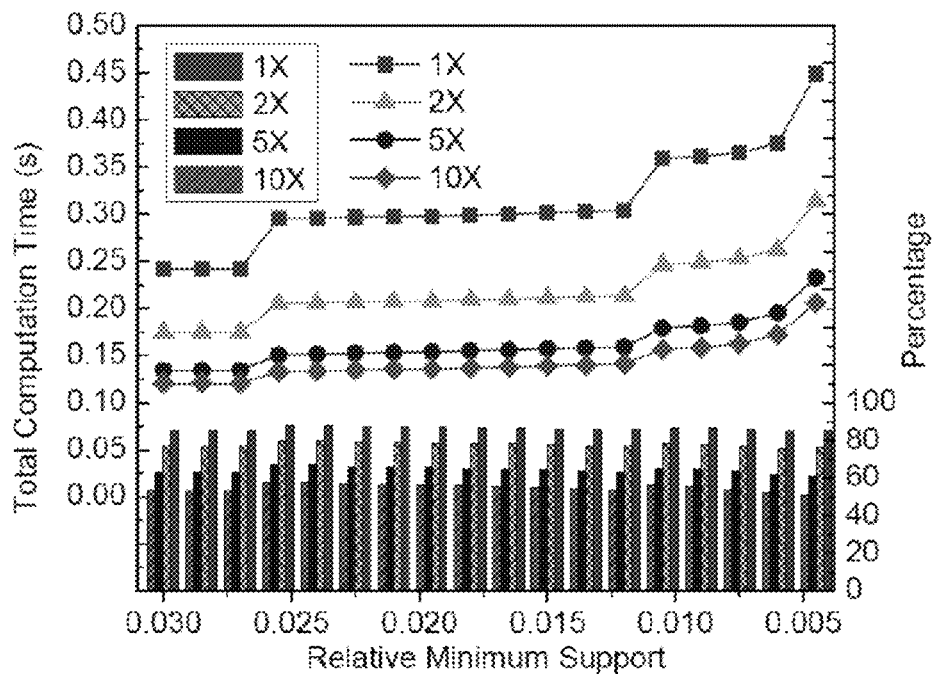

From FIGS. 5 and 6, it is observed that configuration time dominates the total AP matching and counting time, 80%-90% of the AP time for all cases. Fortunately, the latency of symbol replacement could be significantly reduced in future generations of the AP, because symbol replacement is simply a series of DRAM writes, and this should be much faster. It is hypothesized that the current times assume some conservative buffering. Reducing symbol replacement could improve the overall performance greatly. FIG. 7 studies the cases of BMS2 and Kosarak, assuming 2x, 5x, and 10x faster symbol replacement. Up to 2.7x speedup is achieved over current AP hardware when assuming 10x faster symbol replacement.

GSP-AP vs. Other SPM Algorithms

Figure 8:
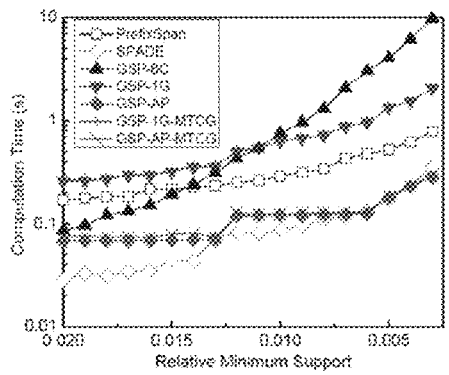
FIGS. 8(a)-(f) illustrate a performance comparison among GSP-GRU, GSP-AP, PrefixSpan, and SPADE in accordance with some embodiments.
Figure 8:
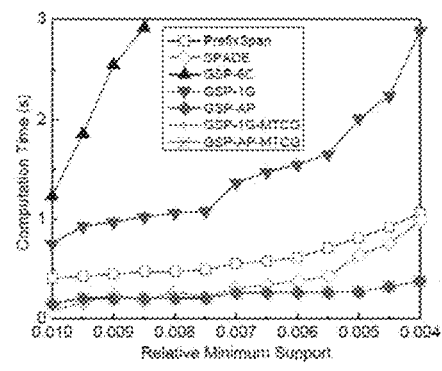
Figure 8:
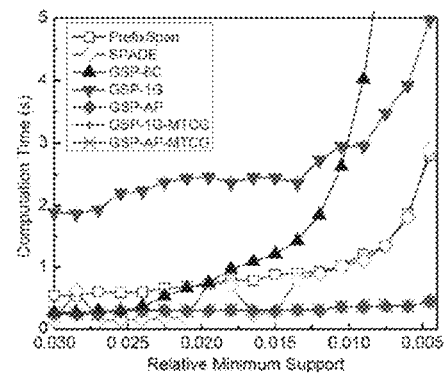
Figure 8:
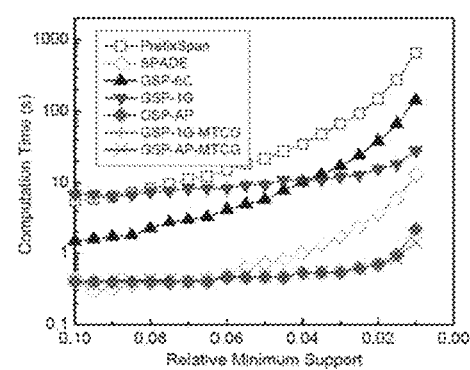
Figure 8:
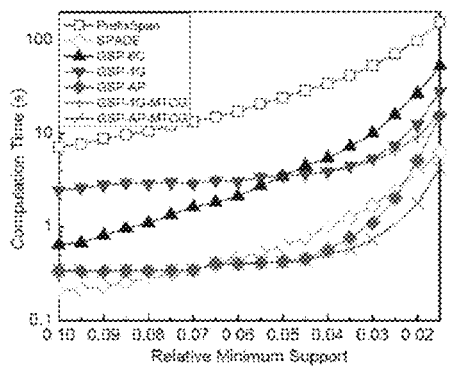
Figure 8:
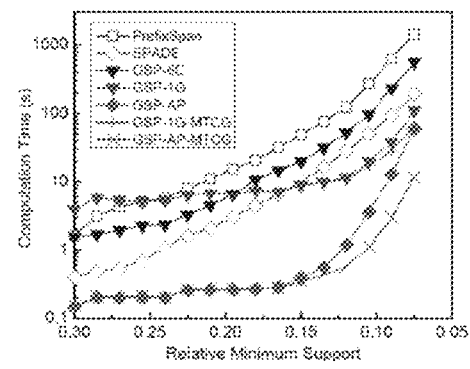

The PrefixSpan and SPADE are two advanced algorithms, which outperform the GSP in general cases. In the present invention, multi-threaded Java implementations of these two algorithms are tested and evaluted on a multi-core CPU. As can be seen in the results, even multi-core PrefixSpan gives poor performance related to the AP. In addition, at least 50x speedup would be needed for PrefixSpan on the GPU to be competitive to the AP. Hence, it is not implemented on the GPU. For SPADE, it is not implemented as well for the GPU, because it runs out of memory for benchmarks larger than 10 MB, assuming a high-end GPU with 24 GB memory, such as the Nvidia K80. Smaller GPUs will fail even earlier. FIG. 8 compares the performance of the Java multi-threaded implementations PrefixSpan and SPADE with hardware accelerate GSP implementations. The performance of GSP-1G is between PrefixSpan and SPADE on average. The proposed GSP-AP outperforms both PrefixSpan and SPADE in most cases, and achieves up to 300× speedup over PrefixSpan (in Bible) and up to 30× speedup over SPADE (in FIFA).

As discussed previously, the performance of AP and GPU solutions suffer from the increasing portion of the un-accelerated candidate-generation stage. Therefore, a multi-threaded candidate generation version for AP and GPU, GSP-AP-MTCG and GSP-1G-MTCG is implemented. The performance improvements are clear in Bible, FIFA, and Leviathan who become candidate-generation dominant at small minimum support numbers. The GSP-AP-MTCG gets 452× speedup over PrefixSpan (in Bible) and up to 49× speedup over SPADE (in FIFA). The speedups of GSP-AP-MTCG over GSP-1G-MTCG become even larger because the same sequential stage is parallelized in the same way.

Performance Scaling with Data Size

In this era of "big data," mining must accommodate ever larger data sets. The original datasets adopted are all below 10 MB, which may once have been representative, but are less so for the future. The scaling of performance as a function of input data sizes is studied. The input data size is enlarged by concatenating duplicates of the whole dataset with an assumption that the number of input sequences will grow much faster than the dictionary size (the number of distinct items) does.

Figure 9:
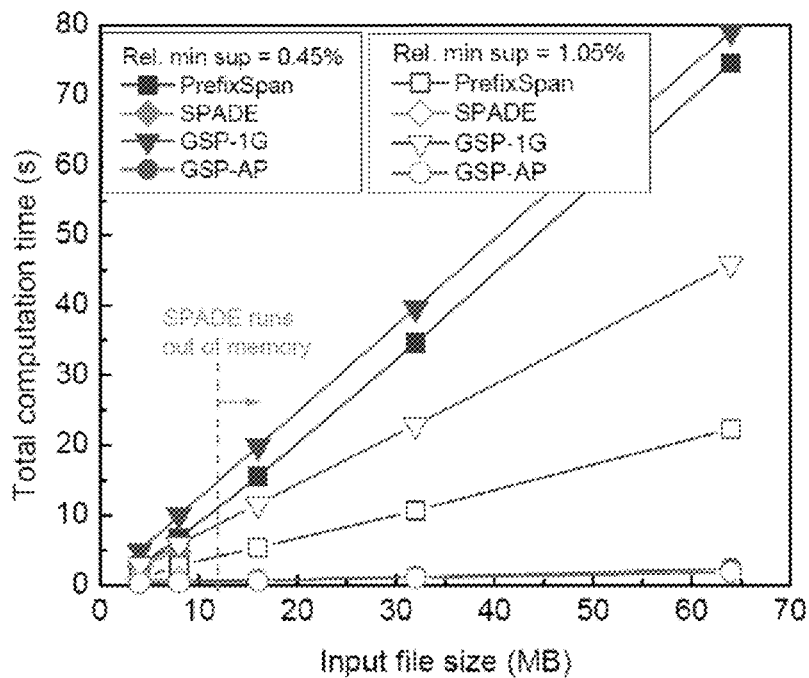
FIGS. 9(a) and (b) illustrate a performance scaling with input data size on Kosarak and Leviathan in accordance with some embodiments.
Figure 9:
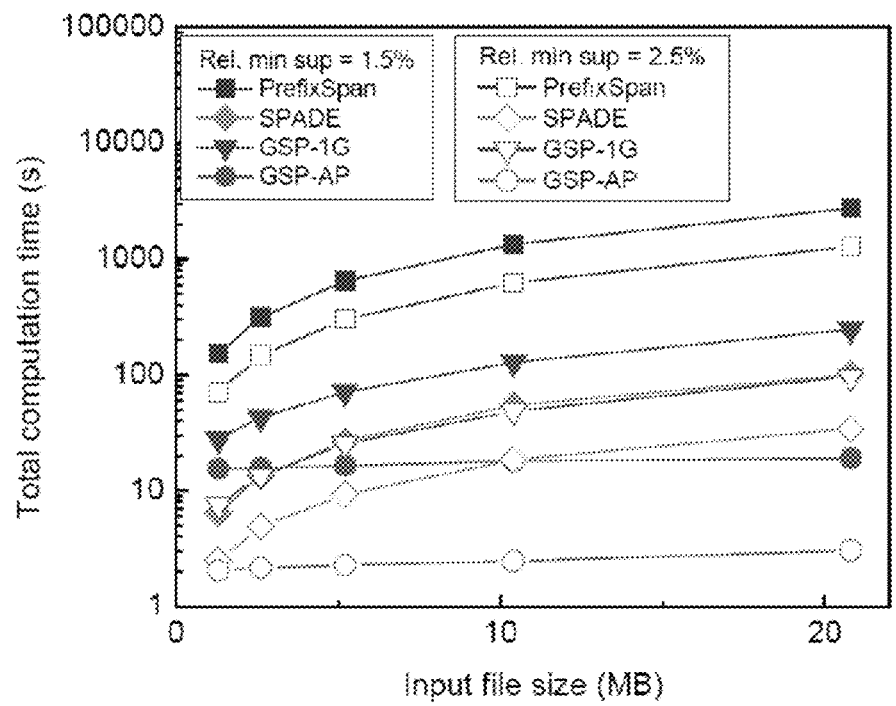

FIG. 9 shows the performance results of input data scaling on Kosarak and Leviathan. The total execution times of all tested methods, PrefixSpan, SPADE, GSP-1G, and GSP-AP, increase linearly with the input data size on both benchmarks. The SPADE method runs out of memory (32 GB on the CPU) for both tested minimum support numbers on Kosarak at input size larger than 10 MB. Given a smaller GPU on-board memory, a GPU SPADE would fail at even smaller datasets. The execution time of the proposed GSP-AP method scales much more favorably than other methods. Its speedup over PrefixSpan grows with larger data sizes and reaches 31× at a relative minimum support of 0.45%. A GPU implementation of PrdixSpat is unlikely to gain more speedup over the multi-threaded PrefixSpan shown here. For these reasons, the GPU implementations of PrefixSpan and SPADE are not needed in the present invention. In the case of Leviathan, GSP-AP shows worse performance than SPADE at small datasets, but outperforms it at large datasets. In this case, GSP-AP achieves up to 420× speedup over PrefixSpan and 11× speedup over SPADE.

Figure 10:
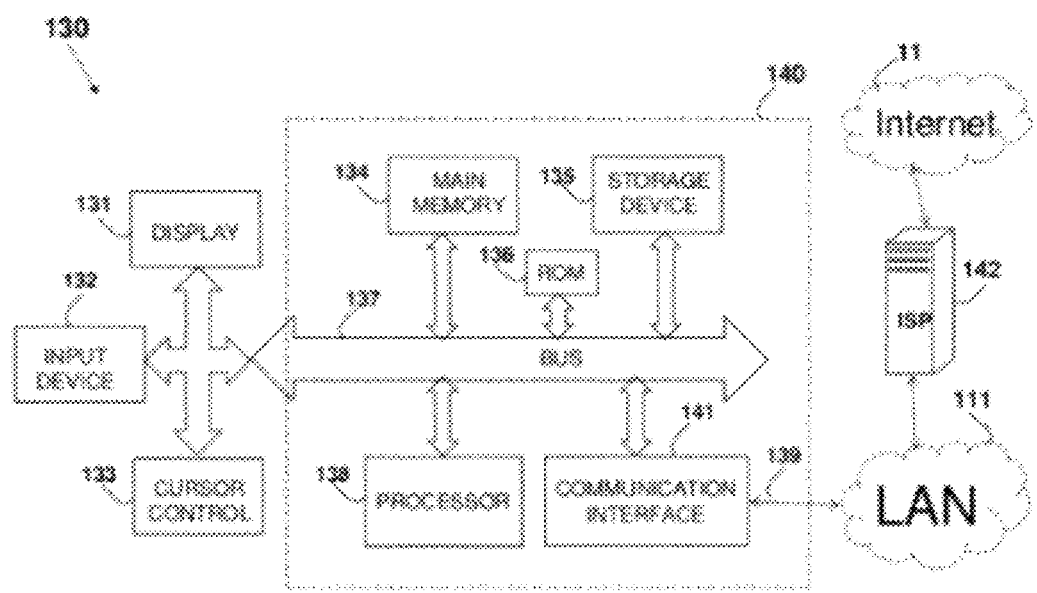
FIG. 10 is a block diagram that illustrates a system including a computer system and the associated Internet connection upon which, an embodiment, or a portion thereof, may be implemented in accordance with some embodiments.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the FIG. 10 is a block diagram that illustrates a system 130 including a computer system 140 and the associated Internet 11 connection upon which an embodiment, or a portion thereof, may be implemented. Such configuration is typically used for computers (hosts) connected to the Internet 11 and executing a server or a client (or a combination) software. A source computer such as laptop, an ultimate destination computer and relay servers, for example, as well as any computer or processor described herein, may use the computer system configuration and the Internet connection shown in FIG. 10. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 10 illustrates various components of a computer system, it is not intended to represent any particular architecture or manner of interconnecting the components; as such details are not germane to the present invention. It will also be appreciated that network computers, hand-held computers, cell phones and other data processing systems which have fewer components or perhaps more components may also be used. The computer system of FIG. 10 may, for example, be an Apple Macintosh computer or Power Book, or an IBM compatible PC. Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138.

Main memory 134 also may be used for storing temporary variables or other intermediate information during execution of instructions to be executed by processor 138. Computer system 140 further includes a Read Only Memory (ROM) 136 (or other non-volatile memory) or other static storage device coupled to bus 137 for storing static information and instructions for processor 138. A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, is coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" for "machine-readable medium") as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio wave and infrared data communications, or other form of propagated signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infra-red transmitter to convert the data to an infra-red signal. An infra-red detector can receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also includes a communication interface 141 coupled to bus 137. Communication interface 141 provides a two-way data communication coupling to a network link 139 that is connected to a local network 111. For example, communication interface 141 may be an Integrated Services Digital Network (ISDN) card or as modem to provide a data communication connection to a corresponding type of telephone line. As another non-limiting example, communication interface 141 may be a local area network (LAN) card to provide a data communication connection to a compatible LAN. For example, Ethernet based connection based on IEEE802.3 standard may be used such as 10/100BaseT, 1000BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (6/99), "Internetworking Technologies Handbook", Chapter 7: "Ethernet Technologies", pages 7-1 to 7-38. which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet "LAN91C111 10/100 Non-PCI Ethernet Single Chip MAC+PHY" Data-Sheet, Rev. 15 (02-20-04), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and the signals on the network link 139 and through the communication interface 141, which carry the digital data to and from computer system 140, are exemplary forms of carrier waves transporting the information.

A received code may be executed by processor 138 as it is received, and/or stored in storage device 135, or other non-volatile storage for later execution. In this manner, computer system 140 may obtain application code in the form of a carrier wave.

Accordingly, an aspect of an embodiment provides, but not limited thereto, a system, method and computer readable medium for power pad placement of power delivery networks (PDN), which is important in, for example, computer-automated-design (CAD) of integrated circuits. It should be appreciated that the related optimization system and method and the related networks, computer systems, internee, and components and functions may be implemented according to the scheme(s) disclosed herein.

Various embodiments or aspects of the invention, for example, can be implemented as software in a computing device, or alternatively, on hardware. An exemplary computing device in which an embodiment of the invention, or a portion thereof, can be implemented is schematically illustrated in FIG. 10. Although some aspects may be known, a brief explanation will be provided herein for the convenience of other readers.

Figure 11:
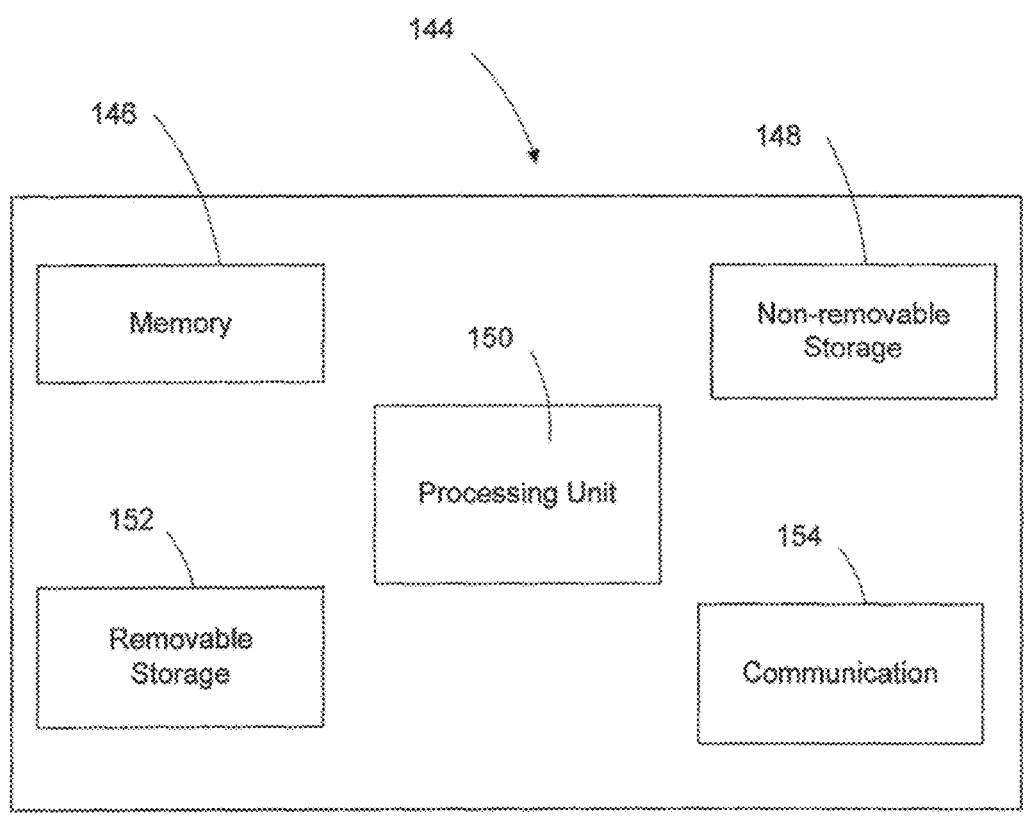
FIGS. 11 and 12 illustrate an exemplary computing device, in which an embodiment of the invention, or a portion thereof, can be implemented.

Referring to FIG. 11, in its most basic configuration, computing device 144 typically includes at least one processing unit 150 and memory 146. Depending on the exact configuration and type of computing device, memory 146 can be volatile (such as RAM), non-volatile (such as ROM, flash memory, etc.) or some combination of the two.

Additionally, device 144 may also have other features and/or functionality. For example, the device could also include additional removable and/or non-removable storage including, but not limited to, magnetic or optical disks or tape, as well as writable electrical storage media. Such additional storage is the figure by removable storage 152 and non-removable storage 148. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology-CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

The device may also contain one or more communications connections 154 that allow the device to communicate with other devices (e.g., other computing devices). The communications connections carry information in a communication media. Communication media typically embodies computer readable instructions, data structures, program modules or other data in a modulated data signal such as a carrier wave or other transport mechanism and includes any information delivery media. The term modulated data signal means a signal that has one or more of its characteristics set or changed in such a manner as to encode, execute, or process information in the signal. By way of example, and not limitation, communication medium includes wired media such as a wired network or direct-wired connection, and wireless media such as radio, RF, infrared and other wireless media. As discussed above, the term computer readable media as used herein includes both storage media and communication media.

Figure 12:
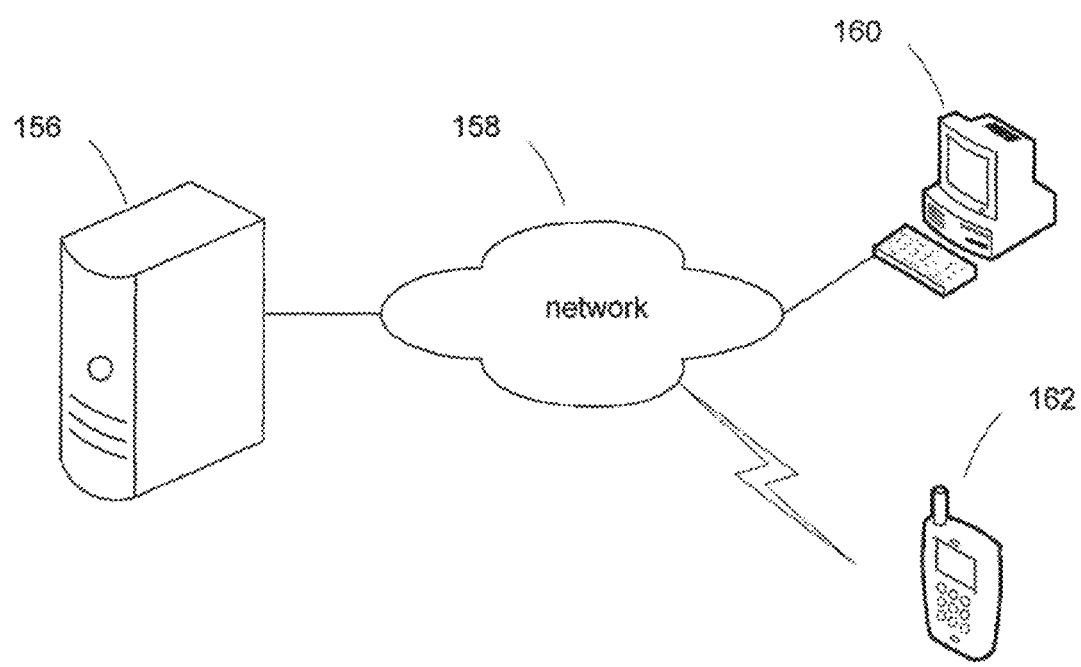

In addition to a stand-alone computing machine, embodiments of the invention can also be implemented on a network system comprising a plurality of computing devices that are in communication with a networking means, such as a network with an infrastructure or an ad hoc network. The network connection can be wired connections or wireless connections. As a way of example, FIG. 12 illustrates a network system in which embodiments of the invention can be implemented. In this example, the network system comprises computer 156 (e.g., a network server), network connection means 158 (e.g., wired and/or wireless connections), computer terminal 160, and PDA (e.g., a smart-phone) 162 (or other handheld or portable device, such as a cell phone, laptop computer, tablet computer, GPS receiver, mp3 player, handheld video player, pocket projector etc. or handheld devices (or non portable devices) with combinations of such features). The embodiments of the invention can be implemented in anyone of the devices of the system. For example, execution of the instructions or other desired processing can be performed on the same computing device that is anyone of 156, 160, and 162. Alternatively, an embodiment of the invention can be performed on different computing devices of the network system. For example, certain desired or required processing or execution can be performed on one of the computing devices of the network (e.g., server 156), whereas other processing and execution of the instruction can be performed at another computing device (e.g., terminal 160) of the network system, or vice versa. In fact, certain processing or execution can be performed at one computing device (e.g., server 156); and the other processing or execution of the instructions can be performed at different computing devices that may or may not be networked. For example, the certain processing can be performed at terminal 160, while the other processing or instructions are passed to device 162 where the instructions are executed. This scenario may be of particular value especially when the PDA device, for example, accesses to the network through computer terminal 160 (or an access point in an ad hoc network). For another example, software to be protected can be executed, encoded or processed with one or more embodiments of the invention. The processed, encoded or executed software can then be distributed to customers. The distribution can be in a form of storage media (e.g., disk) or electronic copy.

Practice of an aspect of an embodiment (or embodiments) of the invention is presented herein for illustration only and should not be construed as limiting the invention in any way.

An approach of the present invention systems and designs and optimization system and techniques may be based on the tools, programs and operating systems as discussed throughout this disclosure, such techniques can be applied to various hardware, tools, operating systems, virtual machine, PVM, or executable format.

Figure 13:
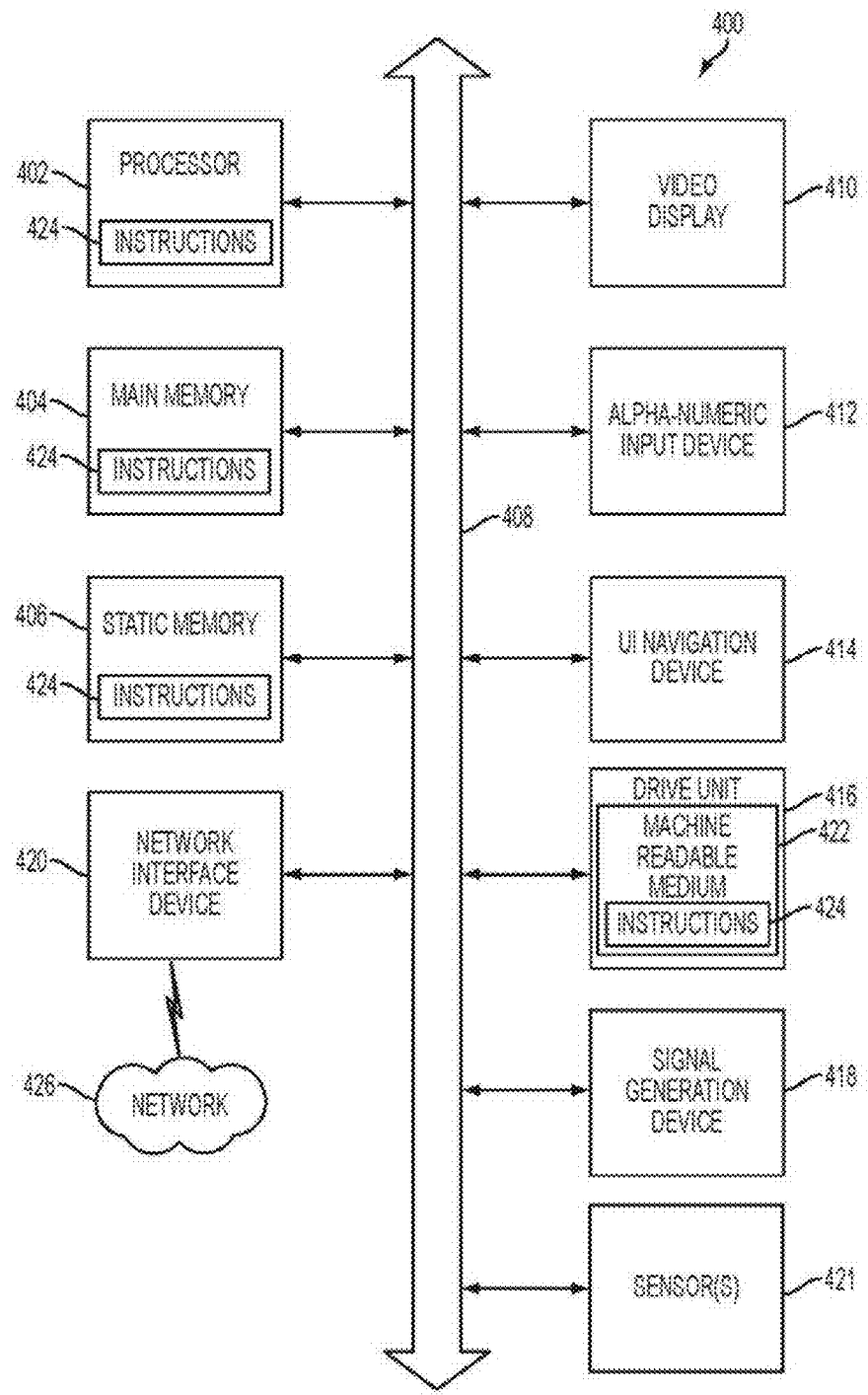
FIG. 13 is a block diagram illustrating an example of a machine upon which one or more aspects of embodiments of the present invention can be implemented.

FIG. 13 is a block diagram illustrating an example of a machine upon which one or more aspects of embodiments of the present invention can be implemented.

FIG. 13 illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term circuit is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such Circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400 and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed)

by the machine 400. Further, while only a single machine 400 is illustrated, the term machine shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 410, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologiesor functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium. 422 is illustrated as a single medium, the term "machine readable medium" can include a single medium or multiple media (e.g., a centralized or distributed database, and/or associated caches and servers) that configured to store the one or more instructions 424. The term machine readable medium can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term machine readable medium can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi, IEEE 802.16 standards family known as WiMax), peer-to-peer (P2P) networks, among others. The term transmission medium shall be taken to include any intangible medium that is capable of storing, encoding, or carrying instructions for execution by the machine, and includes digital or analog communications signals or other intangible medium to facilitate communication of such software.

Practice of an aspect of an embodiment (or embodiments) of the invention is presented herein for illustration only and should not be construed as limiting the invention in any way. An approach of the present invention systems and designs and optimization system and techniques may be based on the tools, programs and operating systems as discussed throughout this disclosure, such techniques can be applied to various hardware, tools, operating systems, virtual machine, PVM, or executable format.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A processor for discovering a plurality of hierarchical patterns in datasets, the processor comprises a plurality of functional elements comprising:
    a plurality of state transition elements; and
    a plurality of counters,
    wherein the processor is capable of a replacement of symbol sets of the plurality of state transition elements and threshold values of the plurality of counters,
    wherein the plurality of counters are configured to work with the plurality of state transition elements to increase space efficiency of automata implementation,
    wherein the plurality of hierarchical patterns include continuous or discontinuous sequences of sets, continuous or discontinuous sequences of sequences, or sets of continuous or discontinuous sequences in the datasets,
    wherein a plurality of original hierarchical patterns are defined as sequential patterns, each sequential pattern is composed of a collection of itemsets, an element of the sequential pattern is formed by an assortment of items selected from a predefined set of items, and one item occurs just once in one itemset;
    wherein the plurality of original hierarchical patterns are flattened into strings by adding and using delimiters and place-holders to reduce automata design space for candidate sequential patterns and to a discontinuous sequence-matching problem,
    wherein the delimiters are configured to bound and connect the strings,
    wherein an itemset delimiter is added between two adjacent strings converted from two adjacent itemsets in a sequence,
    wherein the plurality of state transition elements includes place-holder state transition elements configured to represent the place-holders, the place-holders including an itemset position holder and an item position holder,
    wherein the plurality of state transition elements further includes item state transition elements configured to represent the items in the predefined set of items, and each item in the predefined set of items has a corresponding place-holder,
    wherein the first place-holder corresponding to the first item in each itemset is the itemset position holder, and any other place-holders corresponding to items except the first item are item position holders, wherein, during a sequential pattern matching, a place-holder state transition element representing the itemset position holder is configured to stay activated before the end of a sequence, and a place-holder state transition element representing the item position holder is configured to stay activated only within an input itemset, wherein the place-holder state transition element representing the itemset position holder is configured to match symbols including all items in the predefined set of items and the itemset delimiter, and the place-holder state transition element representing the item position holder is configured to match symbols including all items in the predefined set of items except the delimiters, wherein template automata for discovering the plurality of hierarchical patterns in the datasets is compiled before runtime and replicated to make a full use of the capacity and parallelism of the processor, and wherein the processor is configured to reduce the automata design space of the candidate sequential patterns of a given length from multiple patterns to a single pattern template for pre-compiling a library of automata for each level.

2. The processor according to claim 1, wherein the plurality of state transition elements are based on memory columns implemented in DRAM (Dynamic Random-Access Memory) memory technology.

3. The processor according to claim 1, wherein the processor is implemented in PCRAM (Phase-Change Random-Access Memory), STTRAM (Spin-Transfer Torque Random-Access Memory), or RRAM (Resistive Random-Access Memory).

4. The processor according to claim 1, wherein each of the plurality of state transition elements is configured to match a set of multiple-bit signals.

5. The processor according to claim 1, wherein a group of the plurality of state transition elements is connected to implement a non-deterministic finite automaton (NFA) to match one of the plurality of hierarchical patterns in the datasets.

6. The processor according to claim 1, wherein the plurality of counters are configured to connect to a finite automaton to count the occurrence of one of the plurality of hierarchical patterns in the datasets and make reports or activate the plurality of functional elements when a predetermined threshold is reached.

7. The processor according to claim 6, wherein a plurality of finite automata are accommodated on a chip and are capable of matching and counting the plurality of hierarchical patterns in parallel.

8. The processor according to claim 1, wherein the processor takes input streams of multiple-bit signals and is capable of processing a plurality of data streams concurrently.

9. The processor according to claim 1, wherein any of the plurality of functional elements can be configured as a reporting element, wherein the reporting element generates one-bit or multiple-bit signals when it matches input streams of multiple-bit signals.

10. The processor according to claim 1, wherein the single pattern template has a same encoded pattern length for the candidate sequential patterns of the given length from multiple patterns, and the set delimiter is counted in the encoded pattern length.

11. The processor according to claim 1, wherein the single pattern template includes multiple entries, an entry in the multiple entries is enabled by a sequence delimiter, and other entries in the multiple entries are blocked.

12. A method of discovering a plurality of hierarchical patterns in datasets by a processor, the method comprising steps of:
    preprocessing an input dataset for making it compatible with a working interface of the processor; and
    designing automata for implementing matching and counting of the plurality of hierarchical patterns in the datasets,
    wherein the plurality of hierarchical patterns include continuous or discontinuous sequences of sets, continuous or discontinuous sequences of sequences, or sets of continuous or discontinuous sequences in the datasets,
    wherein a plurality of original hierarchical patterns are defined as sequential patterns, each sequential pattern is composed of a collection of itemsets, an element of the sequential pattern is formed by an assortment of items selected from a predefined set of items, and one item occurs just once in one itemset,
    wherein the plurality of original hierarchical patterns are flattened into strings by adding and using delimiters and place-holders to reduce automata design space for candidate sequential patterns and to a discontinuous sequence-matching problem,
    wherein the delimiters are configured to bound and connect the strings,
    wherein an itemset delimiter is added between two adjacent strings converted from two adjacent itemsets in a sequence,
    wherein the plurality of state transition elements includes place-holder state transition elements configured to represent the place-holders, the place-holders including an itemset position holder and an item position holder,
    wherein the plurality of state transition elements further includes item state transition elements configured to represent the items in the predefined set of items, and each item in the predefined set of items has a corresponding place-holder,
    wherein the first place-holder corresponding to the first item in each itemset is the itemset position holder, and any other place-holders corresponding to items except the first item are item position holders,
    wherein, during a sequential pattern matching, a place-holder state transition element representing the itemset position holder is configured to stay activated before the end of a sequence, and a place-holder state transition element representing the item position holder is configured to stay activated only within an input itemset,
    wherein the place-holder state transition element representing the itemset position holder is configured to match symbols including all items in the predefined set of items and the itemset delimiter, and the place-holder state transition element representing the item position holder is configured to match symbols including all items in the predefined set of items except the delimiters,
    wherein template automata for discovering the plurality of hierarchical patterns in the datasets is compiled before runtime and replicated to make a full use of the capacity and parallelism of the processor, and
    wherein the processor is configured to reduce the automata design space of the candidate sequential patterns of a given length from multiple patterns to a single pattern template for pre-compiling a library of automata for each level.

13. The method according to claim 12, wherein the matching is implemented by finite automata.

14. The method according to claim 13, wherein the matching is capable of capturing the plurality of hierarchical patterns in the datasets.

15. The method according to claim 14, wherein one or more self-activating states of automata connect to one group of states of automata for multiple-bit signals to hold a position within a potential pattern sequence when one or more mismatches of multiple-bit signals are seen, and hold this position until an end of a transaction, in order to deal with the discontinuous sequences.

16. The method according to claim 14, wherein each one of the plurality of hierarchical patterns is expressed by a non-deterministic finite automaton (NFA) with multiple delimiters to represent boundaries of different levels in the hierarchical pattern.

17. The method according to claim 16, wherein different symbols are reserved as delimiters of different levels to represent hierarchical structures in the plurality of hierarchical patterns.

18. The method according to claim 16, wherein multiple entry points are added to the NFA to make it capable of matching the plurality of hierarchical patterns with different lengths.

19. The method according to claim 13, wherein each of the plurality of hierarchical patterns is represented by a group of automaton states to match one multiple-bit signal per cycle from input streams of multiple-bit signals.

20. The method according to claim 12, wherein the sets are converted to the discontinuous sequences by sorting items of each transaction with a predefined order.

21. The method according to claim 12, wherein the counting uses on-chip counters of the processor to calculate the occurrences of the plurality of hierarchical patterns in the datasets.

22. The method according to claim 12, wherein the method further comprises a step of minimizing an output from the processor by delaying reporting of events to a final processing cycle.

23. The method according to claim 12, wherein the preprocessing of the input datasets further comprises steps of:
filtering out infrequent items from the input datasets;
encoding the filtered items into multiple-bit signals; and
sorting the encoded items within one transaction with a predefined order.

24. An electronic automaton device for discovering a plurality of hierarchical patterns in datasets, each automaton expression of the plurality of hierarchical patterns comprising:
a finite automaton; and
a plurality of counter elements,
wherein the electronic automaton device is configured to recognize the plurality of hierarchical patterns and create a signal when the occurrence of one of the plurality of hierarchical patterns exceeds a given threshold,
wherein the plurality of hierarchical patterns include continuous or discontinuous sequences of sets, continuous or discontinuous sequences of sequences, or sets of continuous or discontinuous sequences in the datasets,
wherein a plurality of original hierarchical patterns are defined as sequential patterns, each sequential pattern is composed of a collection of itemsets, an element of the sequential pattern is formed by an assortment of items selected from a predefined set of items, and one item occurs just once in one itemset,
wherein the plurality of original hierarchical patterns are flattened into strings by adding and using delimiters and place-holders to reduce automata design space for candidate sequential patterns and to a discontinuous sequence-matching problem,
wherein the delimiters are configured to bound and connect the strings,
wherein an itemset delimiter is added between two adjacent strings converted from two adjacent itemsets in a sequence,
wherein the plurality of state transition elements includes place-holder state transition elements configured to represent the place-holders, the place-holders including an itemset position holder and an item position holder,
wherein the plurality of state transition elements further includes item state transition elements configured to represent the items in the predefined set of items, and each item in the predefined set of items has a corresponding place-holder,
wherein the first place-holder corresponding to the first item in each itemset is the itemset position holder, and any other place-holders corresponding to items except the first item are item position holders,
wherein, during a sequential pattern matching, a place-holder state transition element representing the itemset position holder is configured to stay activated before the end of a sequence, and a place-holder state transition element representing the item position holder is configured to stay activated only within an input itemset,
wherein the place-holder state transition element representing the itemset position holder is configured to match symbols including all items in the predefined set of items and the itemset delimiter, and the place-holder state transition element representing the item position holder is configured to match symbols including all items in the predefined set of items except the delimiters,
wherein template automata for discovering the plurality of hierarchical patterns in the datasets is compiled before runtime and replicated to make a full use of the capacity and parallelism of the electronic automaton device, and
wherein the electronic automaton device is configured to reduce the automata design space of the candidate sequential patterns of a given length from multiple patterns to a single pattern template for pre-compiling a library of automata for each level.

25. The electronic automaton device according to claim 24, wherein each of the plurality of hierarchical patterns is represented by one or more states of automaton grouped together to match a sequence of multiple-bit signal from input streams of multiple-bit signals.

26. The electronic automaton device according to claim 25, wherein one or more self-activating states of automaton connect to one group of states of automaton for multiple-bit signals to hold a position within a potential pattern sequence when one or more mismatches of multiple-bit signals are seen, and hold this position until an end of an transaction, in order to deal with the discontinuous sequences.

27. The electronic automaton device according to claim 24, wherein the sets are converted to the discontinuous sequences by sorting items of each transaction with a predefined order.

28. The electronic automaton device according to claim 24, wherein each of the plurality of hierarchical patterns is expressed by a non-deterministic finite automaton (NFA) with multiple delimiters to represent the boundaries of different levels in the plurality of hierarchical patterns.

29. The electronic automaton device according to claim 28, wherein multiple entry points are added to the NFA to make it capable of matching the plurality of hierarchical patterns with different lengths.

30. The electronic automaton device according to claim 24, wherein different symbols are reserved as different level delimiters to represent hierarchical structures in the plurality of hierarchical patterns.

31. The electronic automaton device according to claim 24, wherein the plurality of counter elements are connected to a pattern matching automaton to calculate the occurrence of one of the plurality of hierarchical patterns in the datasets.

* * * * *